United States Patent [19]

Minami et al.

[11] Patent Number: 5,710,094
[45] Date of Patent: Jan. 20, 1998

[54] REVERSIBLE MULTI-COLOR THERMAL RECORDING MEDIUM

[75] Inventors: Toshiaki Minami; Tomoaki Nagai; Kaoru Hamada; Akio Sekine, all of Tokyo, Japan

[73] Assignee: Nippon Paper Industries Co. Ltd., Tokyo, Japan

[21] Appl. No.: 549,240

[22] Filed: Oct. 27, 1995

[30] Foreign Application Priority Data

Oct. 27, 1994 [JP] Japan .................................. 6-262998
Nov. 29, 1994 [JP] Japan .................................. 6-294142

[51] Int. Cl.⁶ .............................. B41M 5/30; B41M 5/34; B41M 5/36
[52] U.S. Cl. ...................... 503/204; 428/64.4; 428/64.8; 503/201; 503/216
[58] Field of Search .................................. 503/201, 204, 503/216; 428/64.4, 64.8

[56] References Cited

U.S. PATENT DOCUMENTS

| 4,268,413 | 5/1981 | Dabisch. | |
|---|---|---|---|
| 4,638,340 | 1/1987 | Iiyama et al. | 503/204 |
| 5,168,029 | 12/1992 | Igarashi et al. | 430/138 |

FOREIGN PATENT DOCUMENTS

| 0530699 | 3/1993 | European Pat. Off. | 503/201 |
|---|---|---|---|
| 54-119377 | 9/1979 | Japan | 503/201 |
| 60-193691 | 10/1985 | Japan | 503/201 |
| 60-257289 | 12/1985 | Japan | 503/201 |
| 63-39377 | 2/1988 | Japan | 503/201 |
| 63-41186 | 2/1988 | Japan | 503/201 |
| 2-188293 | 7/1990 | Japan | 503/201 |
| 2-188294 | 7/1990 | Japan | 503/201 |
| 3-230993 | 10/1991 | Japan | 503/201 |
| 4-366682 | 12/1992 | Japan | 503/201 |
| 6-79970 | 3/1993 | Japan | 503/201 |

OTHER PUBLICATIONS

Patent Abstracts of Japan, vol. 18, No. 383 (M–1640), 19 Jul. 1994 & JP–06–106844 (Toppan Printing Company Ltd.) 19 Apr. 1994.
Patent Abstracts of Japan vol. 18, No. 383 (M–1640), 19 Jul. 1994 & JP–A–06 106849 (Matsushita Electric Indust. Co., Ltd), 19 Apr. 1994.

*Primary Examiner*—Bruce H. Hess

[57] ABSTRACT

To provide a reversible multi-color thermal recording medium or a reversible multi-color optical recording medium which uses novel urea and thiourea derivatives and has excellent heat resistance.

A reversible multi-color thermal recording medium having an irreversible thermal composition containing a colorless or pale basic achromatic dye and an organic color developer as main components and a reversible thermal composition containing a colorless or pale basic achromatic dye and an organic color developer as main components laminated on a support, the organic color developer contained in the irreversible thermal composition being an irreversible heat-resistant color developer and the organic color developer contained in the reversible thermal composition being a reversible heat-resistant color developer.

27 Claims, No Drawings

5,710,094

REVERSIBLE MULTI-COLOR THERMAL RECORDING MEDIUM

BACKGROUND OF THE INVENTION

This invention relates to a reversible multi-color thermal recording medium which is free from color development of its ground when an image is formed or erased, has high sensitivity and provides a vivid color tone.

Thermal recording sheets are generally prepared by the following method. A colorless or pale basic achromatic dye and an organic developer made from a phenolic substance or the like are ground into fine particles and dispersed, and the resulting dispersions are mixed together. To the resultant mixture are added a binder, a filler, a sensitizer, a lubricant and other auxiliaries to prepare a coating fluid. The coating fluid is applied to a support such as paper, synthetic paper, film, plastic or the like to produce a thermal recording sheet. Color development recording is effected by an instantaneous chemical reaction caused by heating with a hot pen, a thermal head, a hot stamp, a laser beam or the like.

These thermal recording sheets are now applied in a wide range of fields such as measuring recorders, terminal printers for computers, facsimiles, automatic ticket vending machines, bar code labels and the like. Along with recent progress in the diversification and the improvement of performance of these recording apparatuses, higher quality is required for the thermal recording sheets. For instance, along with an increase in the speed of recording, the thermal recording sheets are required to obtain high-density and clear color images with extremely small heat energy. Further, the thermal recording sheets are required to be excellent in keeping quality such as light resistance, weather resistance and oil resistance.

On the other hand, due to a sharp increase in the consumption of information recording media resulted by the construction of a variety of networks and the popularization of facsimiles and copiers, waste disposal is becoming a social problem. As one of solutions to this problem, much attention is paid to recording media having reversibility, that is, so-called reversible recording media which allow for repetitions of recording and erasure.

The reversible recording media have been disclosed such as recording media in which a recording material changes between transparent and opaque reversibly according to given temperature, recording media which make use of reversibility of a thermochromic material, recording media which make use of reversible changes in the color tone of a leuco dye, and the like.

The reversible recording media in which a recording material changes between transparent and opaque reversibly are disclosed in Japanese Patent Publication Nos.54-119377, 63-39377, 63-41186, 3-230993 and 4-366682. However, these reversible recording media have such defects as lack of image sharpness, slow decolorization speed and need for temperature control upon erasure.

The reversible recording media making use of a thermochromic material involve the problem that most of thermochromic materials have poor data storage ability and require continuous heat supply to keep color development.

Meanwhile, the reversible recording media making use of reversible changes in the color tone of a leuco dye are disclosed in Japanese Patent Publication Nos. 60-193691, 60-257289 and the like. However, these recording media effect decolorization with water or steam and have problems with practical application. Further, Japanese Patent Publication Nos. 2-188293 and 2-188294 disclose a simple layer-structured material (color developing and subtracting agent) which has both color developing and subtracting functions to provide reversible changes in the color tone of a leuco dye only by controlling heat energy. However, with this color developing and subtracting agent, satisfactory color density cannot be obtained because decolorization process already starts in process of color development. Further, decolorization cannot be accomplished. For this reason, satisfactory image contrast cannot be obtained.

A heated roll which is controlled to a specific temperature is used to erase an image on a reversible recording medium making use of reversible changes in the color tone of a leuco dye. Since a reversible developer used in the reversible recording medium has no heat resistance, the ground of the medium markedly develops a color through heated roll treatment.

As described above, the reversible recording media of the prior art which make use of a reaction between a color coupler and a color developer involve various problems and are still unsatisfactory.

Meanwhile, there have been great needs for multi-color recording media, and double-color thermal recording paper for use in labels, coupon tickets, video printers and the like has been implemented. This thermal recording paper is structured such that it is a laminate consisting of a support and high-temperature and low-temperature color developing layers formed on the support which develop colors with different color developing energies and two different methods have been proposed. One of them is to obtain a color of an image obtained when the high-temperature color developing layer develops a color as an intermediate color between a color developed only by the high-temperature layer and a color developed only by the low-temperature layer without discoloring an image of the low-temperature color-developing layer which develops a color when the high-temperature color developing layer develops a color. In this case, a double-color image having good contrast cannot be obtained unless a color developed by the high-temperature color developing layer can conceal a color developed by the high-temperature color developing layer thoroughly. It is impossible to form a double-color image if a color developed by the low-temperature color developing layer is black.

The other method is to erase a colored image of the low-temperature color developing layer which develops a color simultaneously with the color development of the high-temperature color developing layer, using an appropriate decolorizing agent. In this case, combinations of developed colors are arbitrary. However, since compatibility between color developing property and decolorization property is hard to be obtained, a satisfactory decolorization agent is yet to be discovered.

SUMMARY OF THE INVENTION

It is therefore an object of the invention to provide a reversible multi-color thermal recording medium which is free from color development of its ground when an image is formed or erased, has high sensitivity, and provides a vivid color tone.

This invention has been made to solve the above problems by using an irreversible heat-resistant color developer as an organic color developer contained in an irreversible thermal composition and a reversible heat-resistant color developer as an organic color developer contained in a reversible thermal composition in a reversible multi-color thermal recording medium prepared by laminating the irreversible thermal composition containing a colorless or pale basic achromatic dye and the organic color developer as main components and the reversible thermal composition containing a colorless or pale basic achromatic dye and the organic developer as main components on a support.

In concrete terms, a compound represented by the following general formula (I) or (I') is used as the reversible heat-resistant color developer and at least one of compounds represented by the following general formulae (II), (III), (IV) and (V) is used as the irreversible heat-resistant color developer.

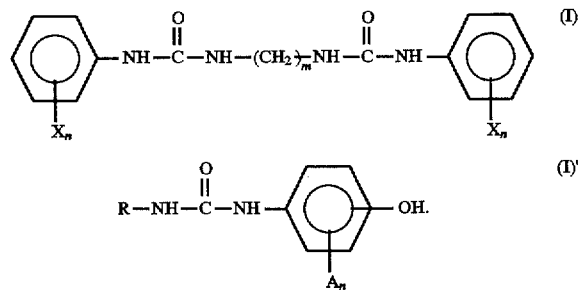

In the above formula (I), X is selected from the group consisting of a hydrogen atom, alkyl group having 1 to 12 carbon atoms, halogenated alkyl group having 1 to 3 carbon atoms, alkoxy group having 1 to 12 carbon atoms, alkoxycarbonyl group having 1 to 12 carbon atoms, acyl group having 1 to 12 carbon atoms, dialkylamino group having 1 to 12 carbon atoms, nitro group, cyano group and halogen atom, m is an integer of 1 to 12, and n is an integer of 1 to 3.

In the above formula (I'), R is an alkyl group having 12 to 22 carbon atoms, A is selected from the group consisting of a lower alkyl group, lower alkoxy group, lower alkoxycarbonyl group, nitro group, halogen atom and hydrogen atom, and n is an integer of 1 to 3.

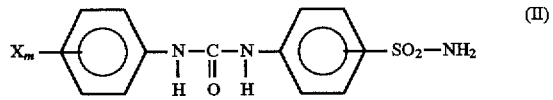

In the above formula, X is selected from the group consisting of a lower alkyl group having 1 to 4 carbon atoms, alkoxy group having 1 to 3 carbon atoms, hydrogen atom, nitro group, cyano group and halogen atom, and m is an integer of 1 to 3.

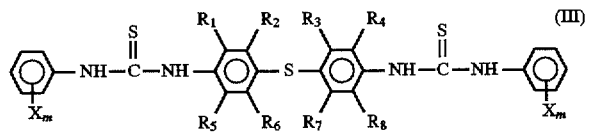

In the above formula, X, R1, R2, R3, R4, R5, R6, R7 and R8 are independently selected from the group consisting of a lower alkyl group having 1 to 6 carbon atoms, alkoxy group having 1 to 6 carbon atoms, hydrogen atom, nitro group, cyano group and halogen atom, and m is an integer of 1 to 3.

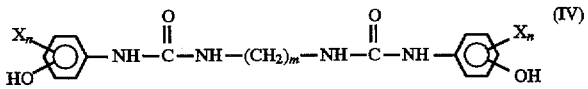

In the above formula, X is selected from the group consisting of a lower alkyl group having 1 to 6 carbon atoms, alkoxy group having 1 to 6 carbon atoms, nitro group, halogen atom and hydrogen atom, m is an integer of 1 to 12, and n is an integer of 1 or 2.

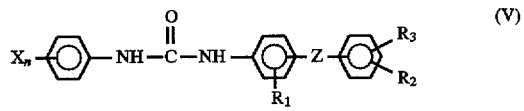

In the above formula, X is selected from the group consisting of an alkyl group having 1 to 12 carbon atoms, alkoxy group having 1 to 12 carbon atoms, trihalogenated methyl group, hydrogen atom, nitro group and halogen atom, Z is selected from the group consisting of O, S, straight chain having 1 to 12 carbon atoms, branched alkylene group, NH, SO$_2$ and C=O, R1, R2 and R3 are independently selected from the group consisting of an alkyl group having 1 to 6 carbon atoms, hydrogen atom, nitro group and halogen atom, and n is an integer of 1 to 3.

As for erasure of an image on the reversible thermal recording medium, various methods are conceivable such as one in which temperature and the amount of heat lower than those at the time of recording are given with a thermal head, a hot stamp, a heated roll or the like for erasure, one in which the amount of light smaller than that at the time of recording is irradiated by a laser, a halogen lamp or the like for erasure, and one in which the ground of a recording medium is brought into contact with a low-boiling alcohol solvent such as methanol and ethanol for erasure. Particularly, a heated roll controlled to 100° to 150° C. is easily used from a view point of operational ease. In this case, since the reversible recording composition and the irreversible recording composition are treated with a heated roll at the same time, a heat-resistant color developer needs to be used to prevent both of the reversible recording composition and the irreversible recording composition from developing colors from their grounds.

Further, as for the order of laminating the reversible recording composition and the irreversible recording composition onto a support, the support, the irreversible recording composition and the reversible recording composition may be laminated in the order named, or the support, the reversible recording composition and the irreversible recording composition may be laminated in the order named. Or two or more layers of the reversible recording composition and the irreversible recording composition may be laminated together.

In the present invention, since the hue of an image obtained by first recording or erasure is made different from the hue of an image recorded next by using a combination of the irreversible recording composition and the reversible recording composition, it is possible to find whether an recorded image is additionally recorded or not.

Illustrative examples of the irreversible heat-resistant color developer used in combination with the leuco dye in the reversible multi-color thermal recording medium of the present invention include the following urea compounds and thiourea compounds. However, the color developer of the present invention is not limited to these.

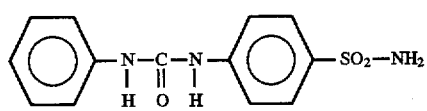 (A1)
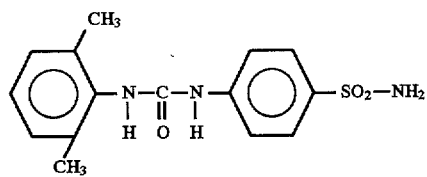 (A2)
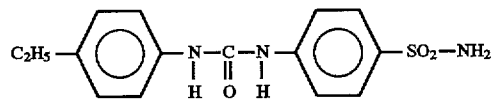 (A3)
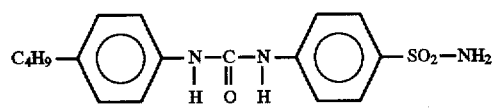 (A4)
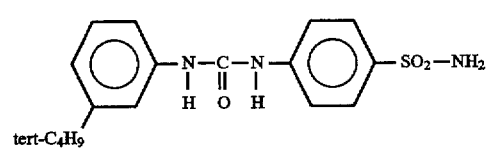 (A5)
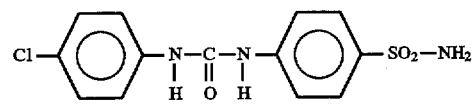 (A6)
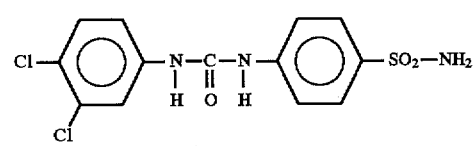 (A7)
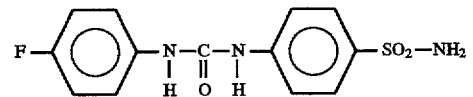 (A8)
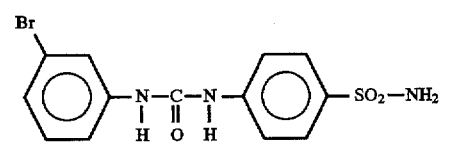 (A9)
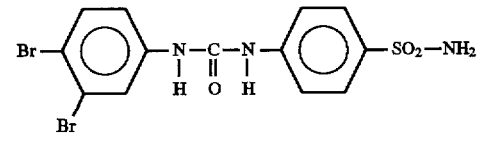 (A10)
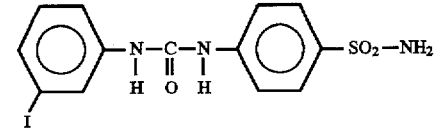 (A11)
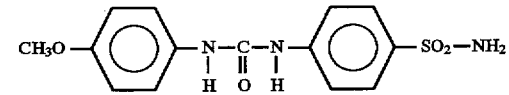 (A12)
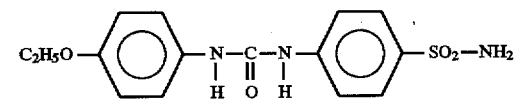 (A13)

-continued
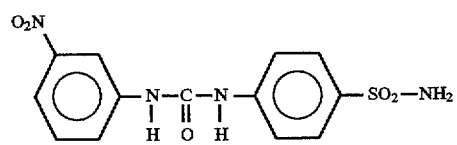 (A14)
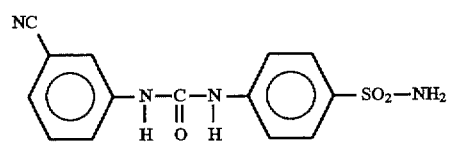 (A15)
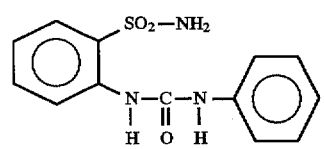 (A16)
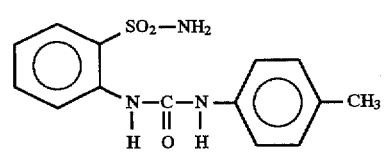 (A17)
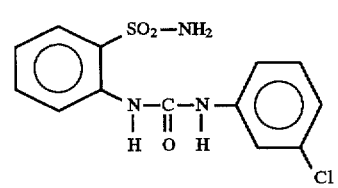 (A18)
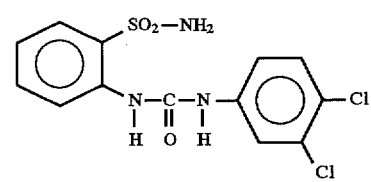 (A19)
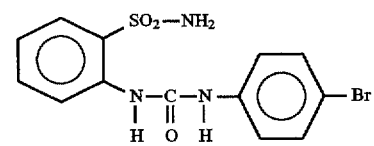 (A20)
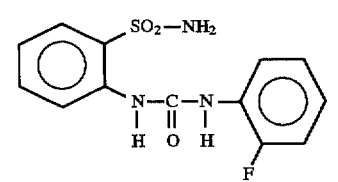 (A21)
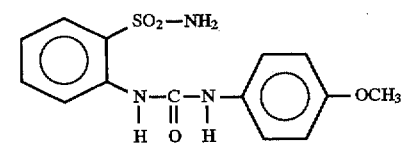 (A22)
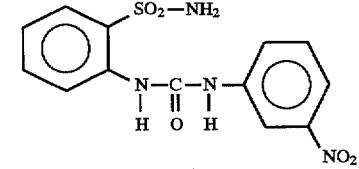 (A23)

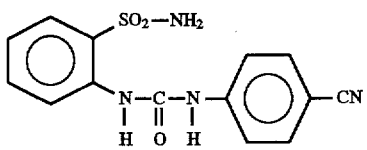 (A24)
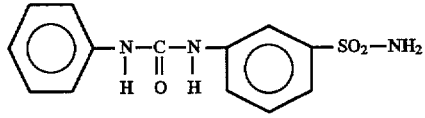 (A25)
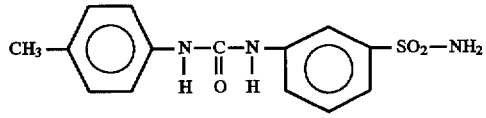 (A26)
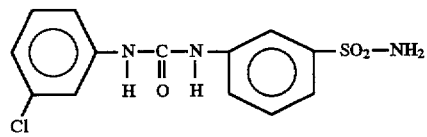 (A27)
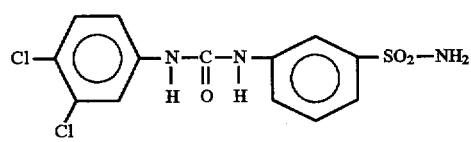 (A28)
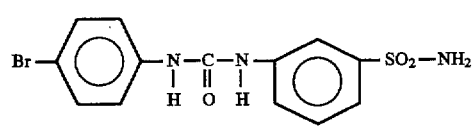 (A29)
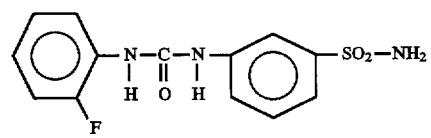 (A30)
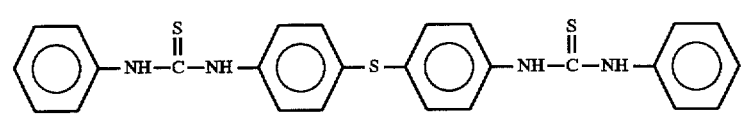 (B1)
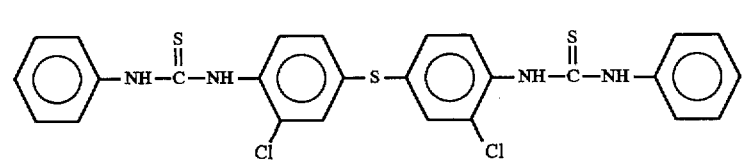 (B2)
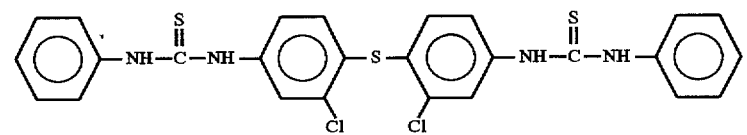 (B3)
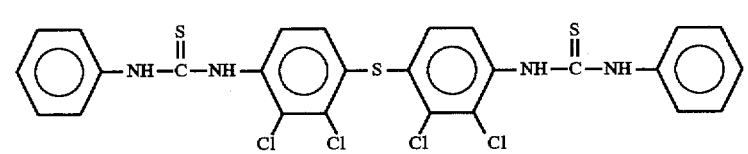 (B4)

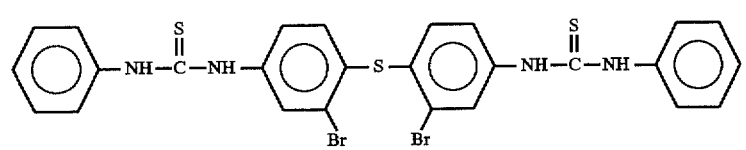
(B5)
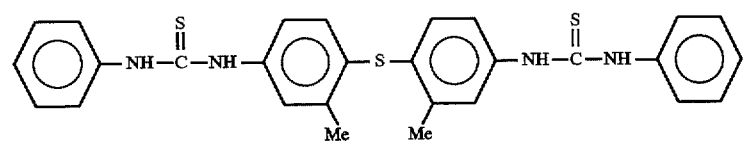
(B6)
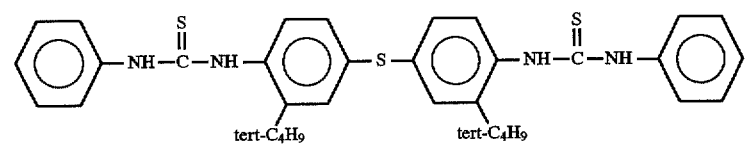
(B7)
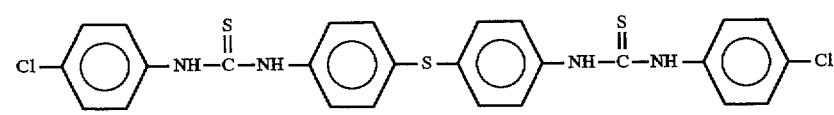
(B8)
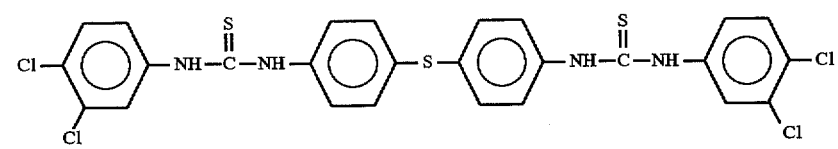
(B9)
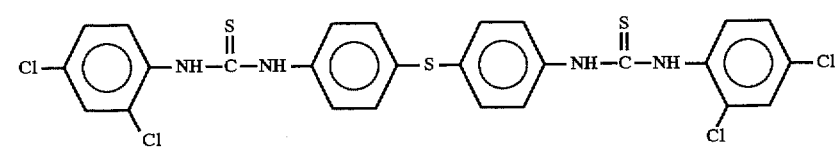
(B10)
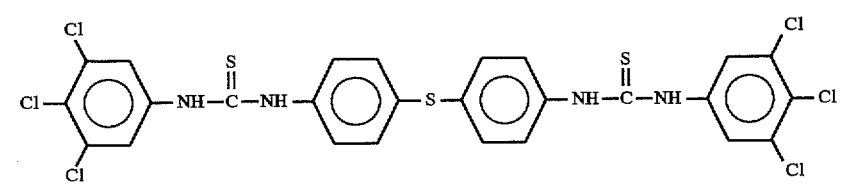
(B11)
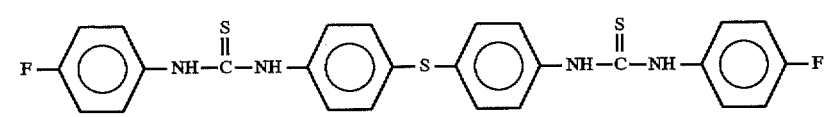
(B12)
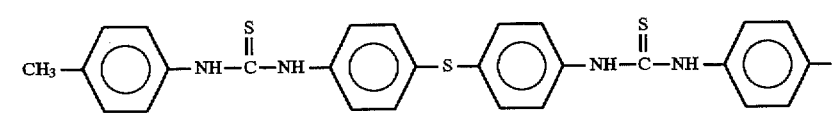
(B13)
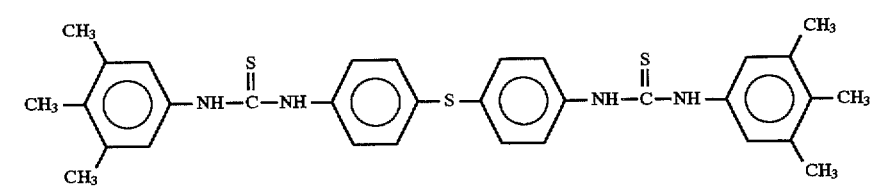
(B14)
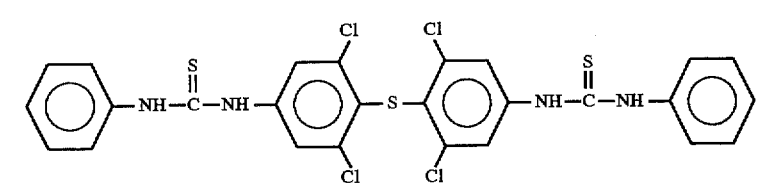
(B15)

-continued
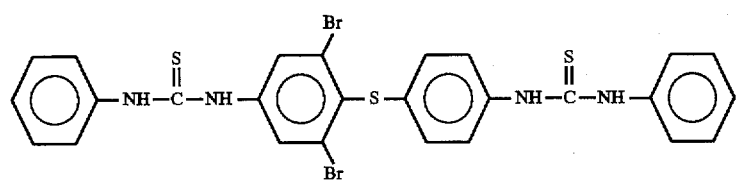 (B16)
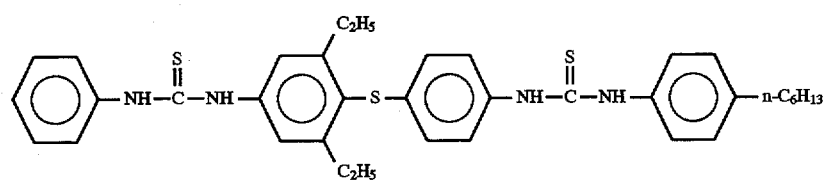 (B17)
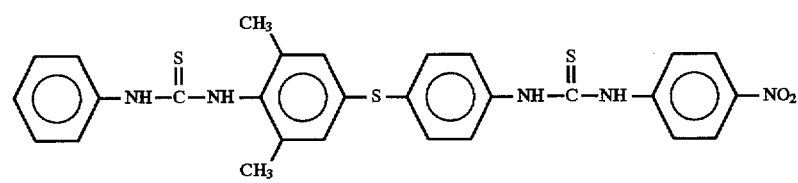 (B18)
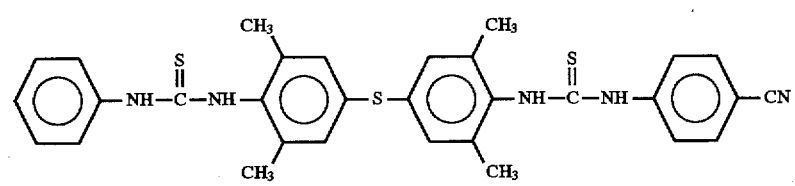 (B19)
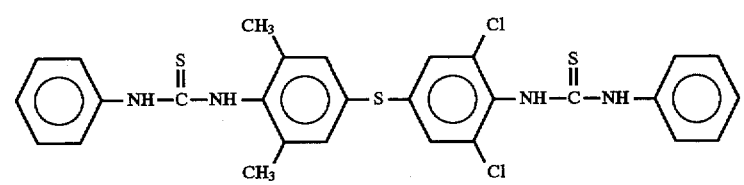 (B20)
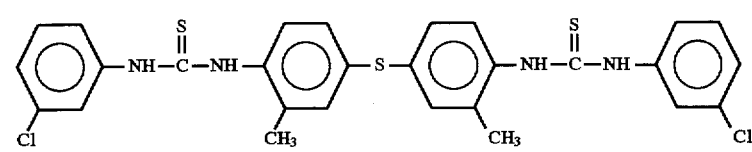 (B21)
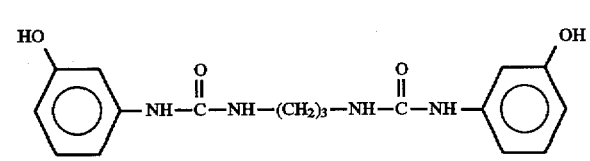 (C1)
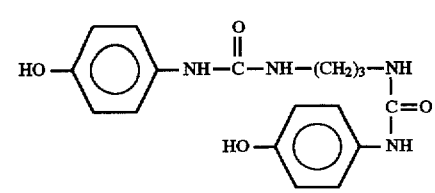 (C2)
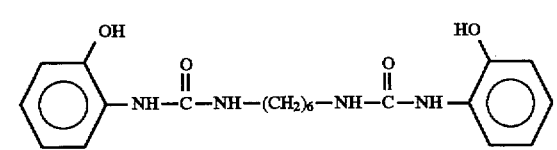 (C3)

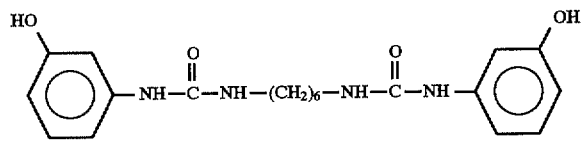
(C4)
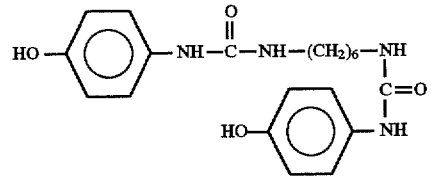
(C5)
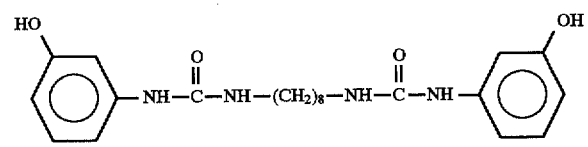
(C6)
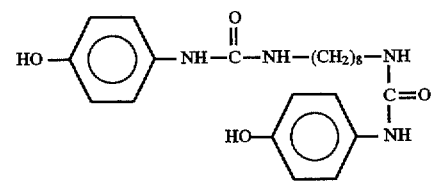
(C7)
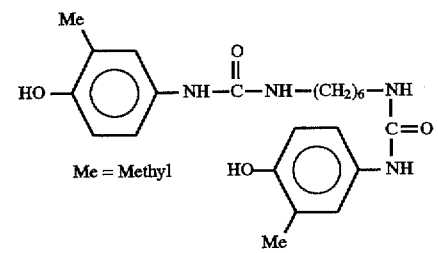
(C8)
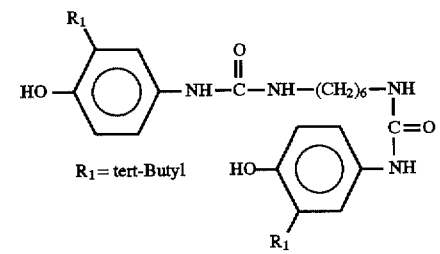
(C9)
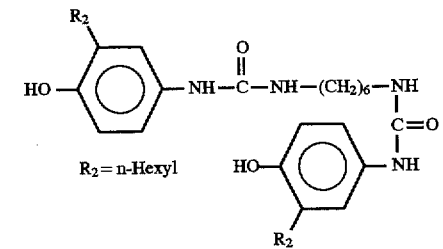
(C10)

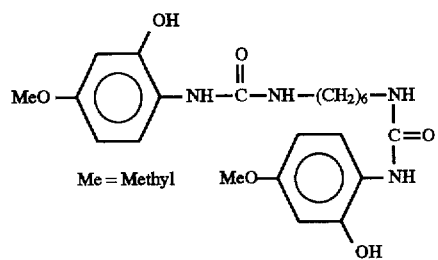 (C11)
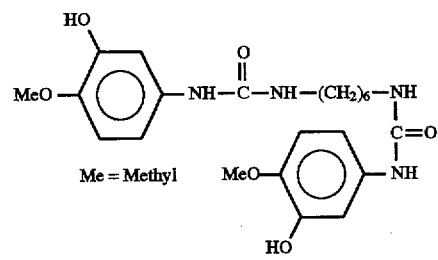 (C12)
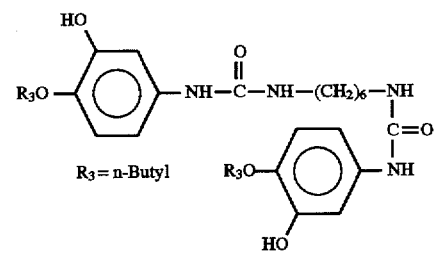 (C13)
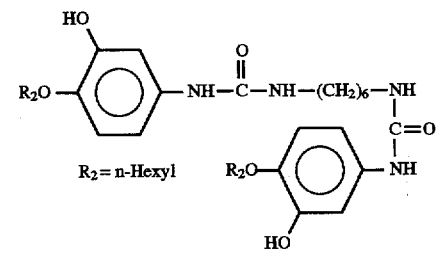 (C14)
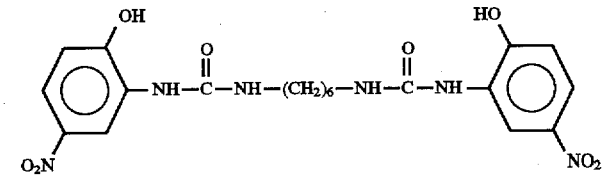 (C-15)
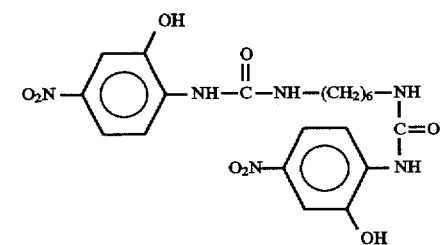 (C16)

-continued
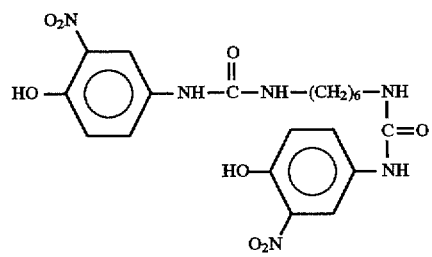
(C17)
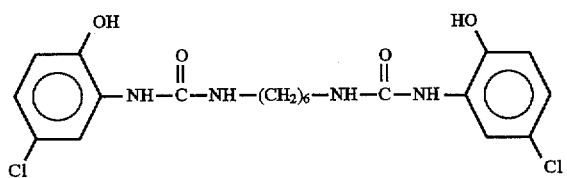
(C18)
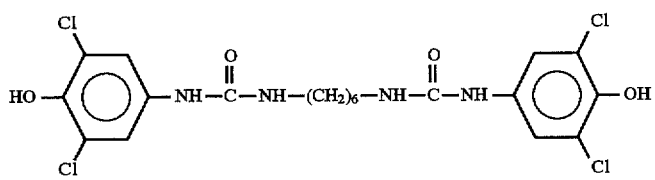
(C19)
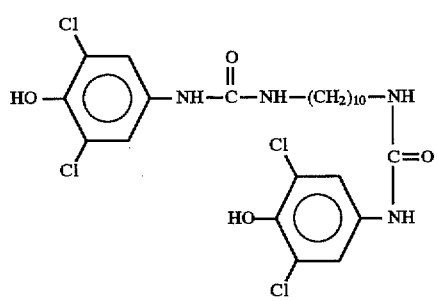
(C20)
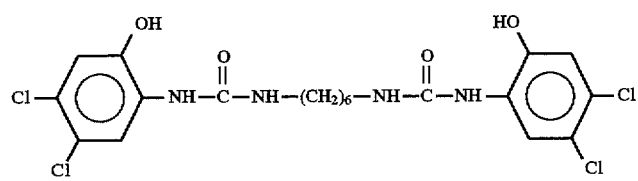
(C21)
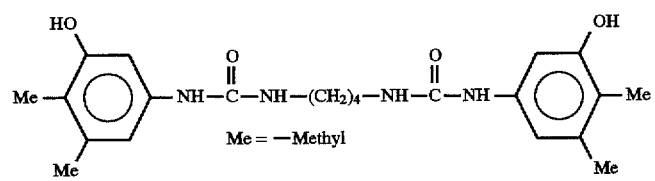
(C22)
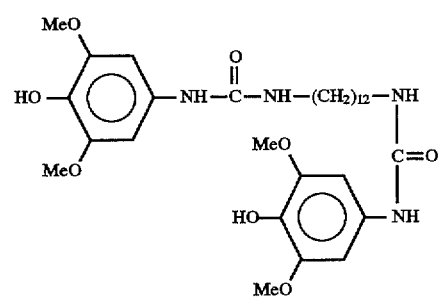
(C23)

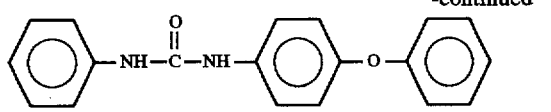 (D1)
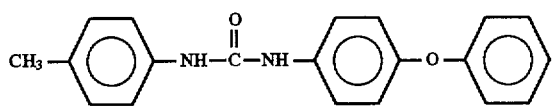 (D2)
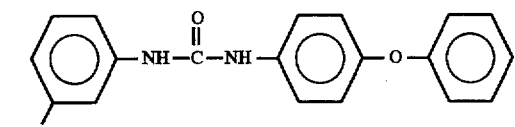 (D3)
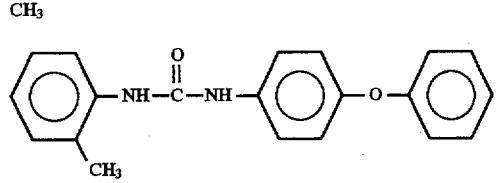 (D4)
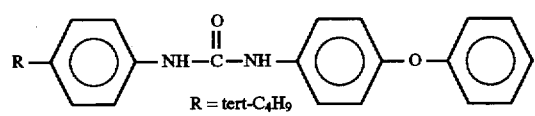 (D5)
R = tert-C$_4$H$_9$
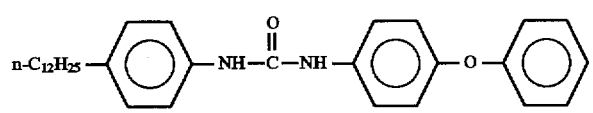 (D6)
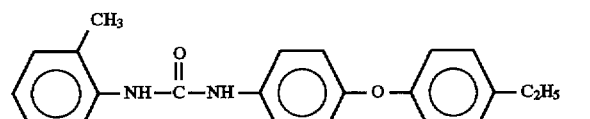 (D7)
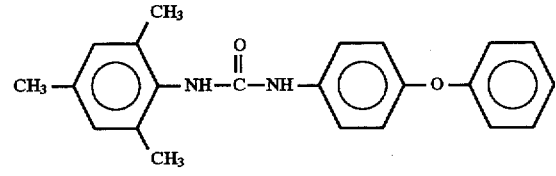 (D8)
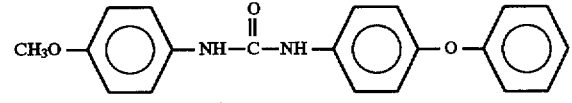 (D9)
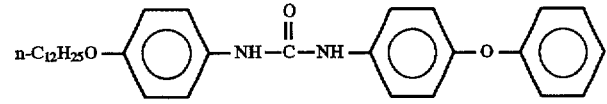 (D10)
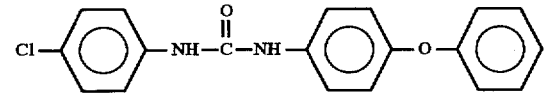 (D11)
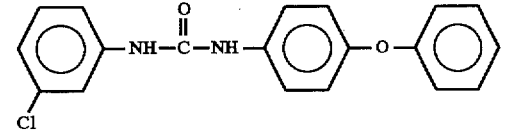 (D12)

-continued
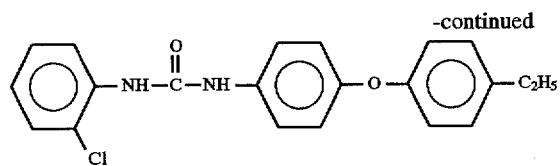
(D13)
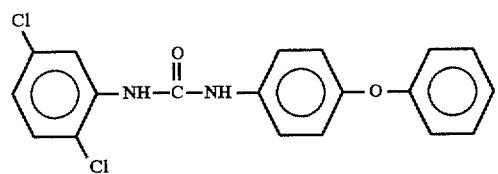
(D14)
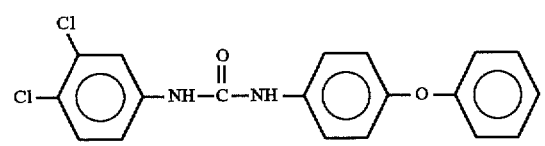
(D15)
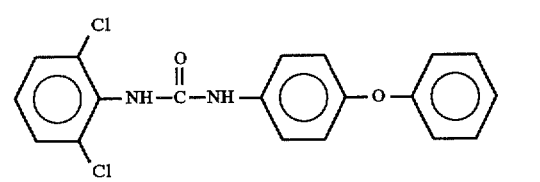
(D16)
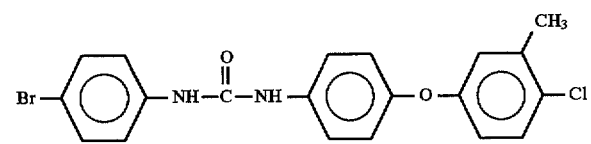
(D17)
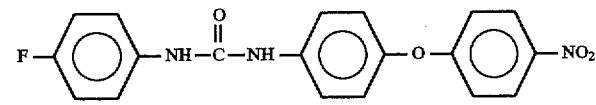
(D18)
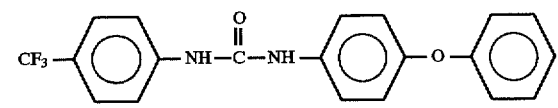
(D19)
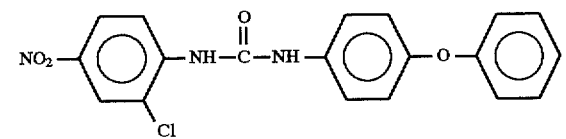
(D20)
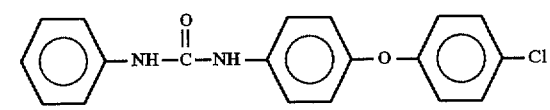
(D21)
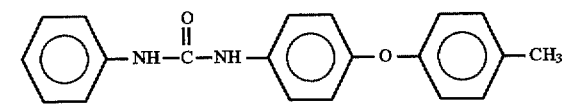
(D22)
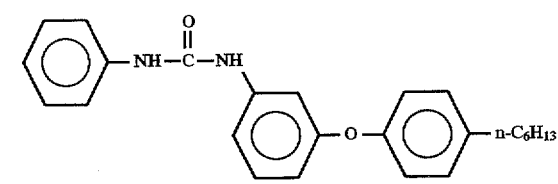
(D23)

-continued
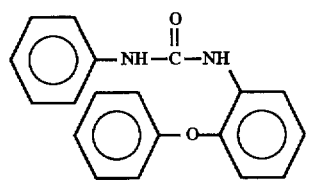
(D24)
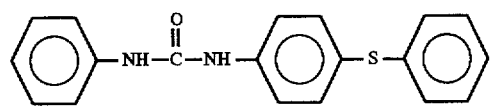
(D25)
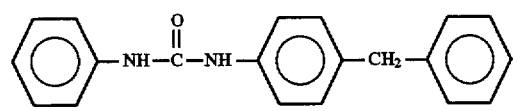
(D26)
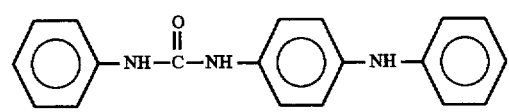
(D27)
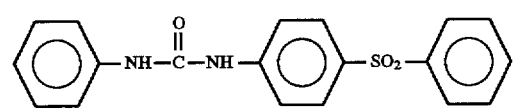
(D28)
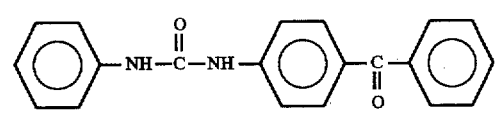
(D29)
In the reversible multi-color thermal recording medium of the present invention, illustrative examples of the reversible thermal developer used in combination with the leuco dye include the following compounds represented by the general formula (I), but it is not limited to these.
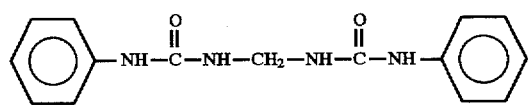
(E1)
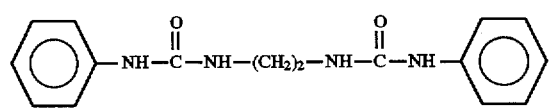
(E2)
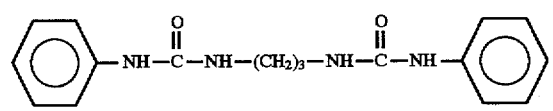
(E3)
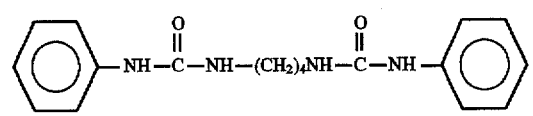
(E4)
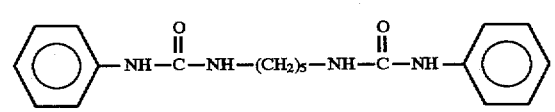
(E5)
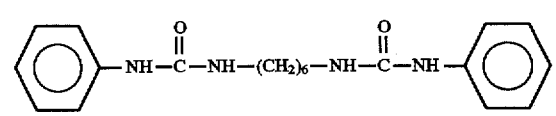
(E6)

-continued
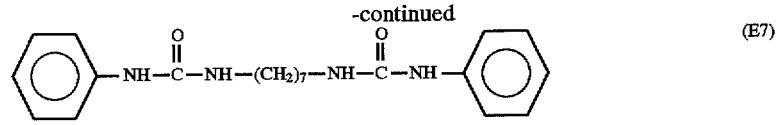
(E7)
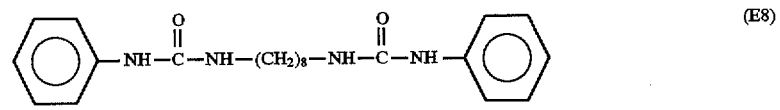
(E8)
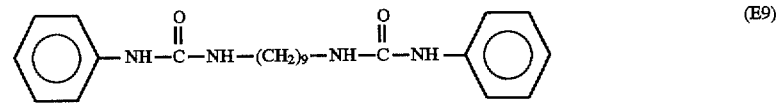
(E9)
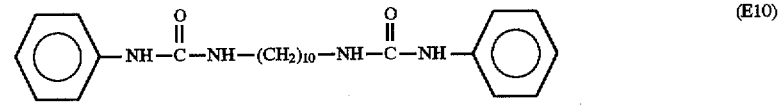
(E10)
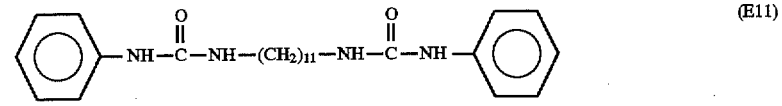
(E11)
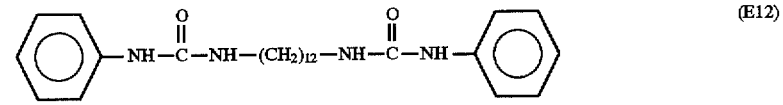
(E12)
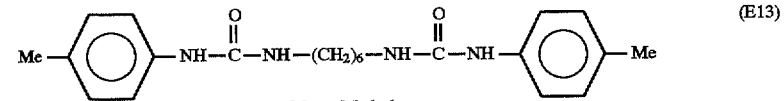
(E13)
Me = -Methyl
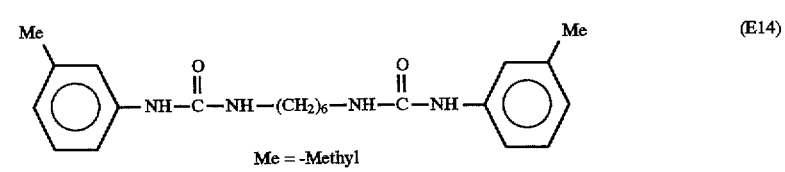
(E14)
Me = -Methyl
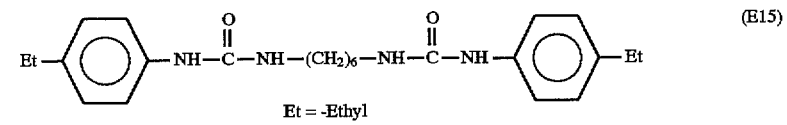
(E15)
Et = -Ethyl
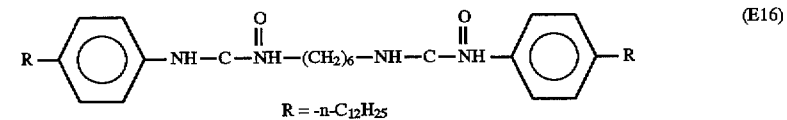
(E16)
R = -n-$C_{12}H_{25}$
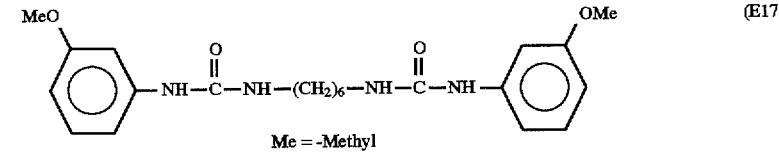
(E17)
Me = -Methyl
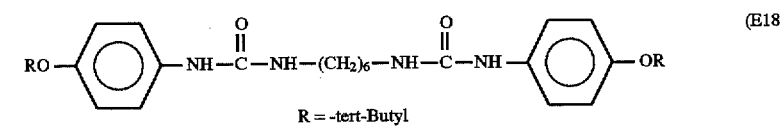
(E18)
R = -tert-Butyl
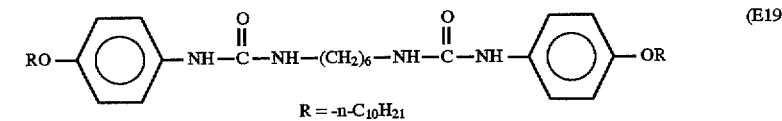
(E19)
R = -n-$C_{10}H_{21}$

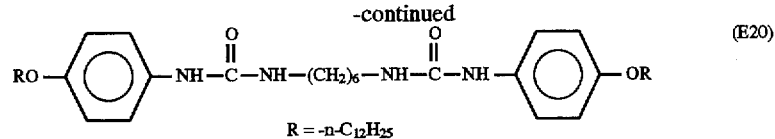
(E20) R = -n-C₁₂H₂₅
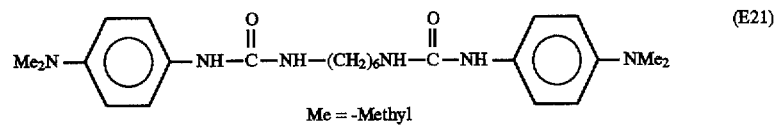
(E21) Me = -Methyl
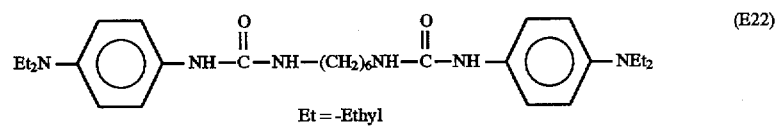
(E22) Et = -Ethyl
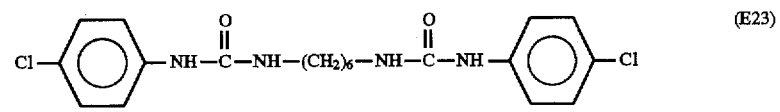
(E23)
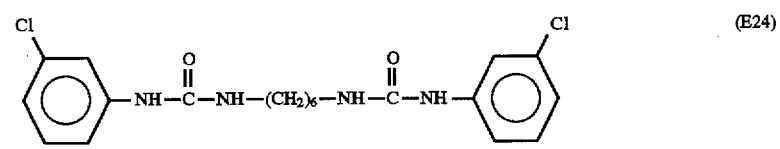
(E24)
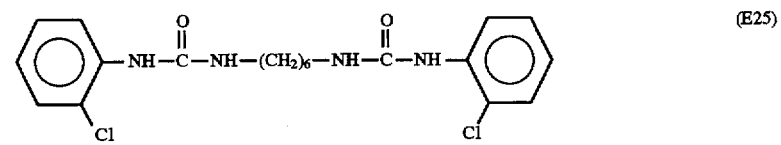
(E25)
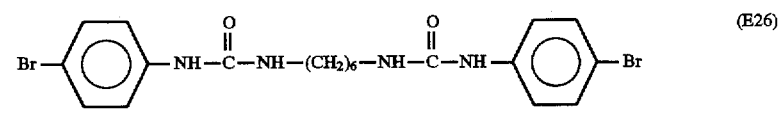
(E26)
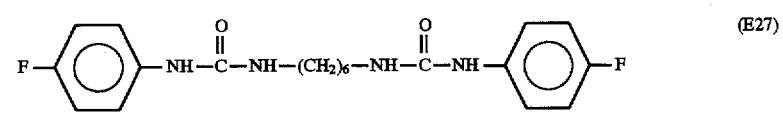
(E27)
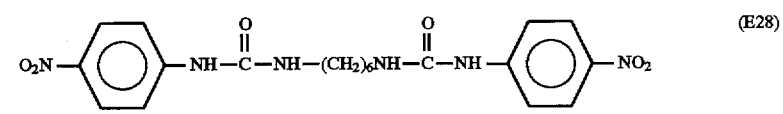
(E28)
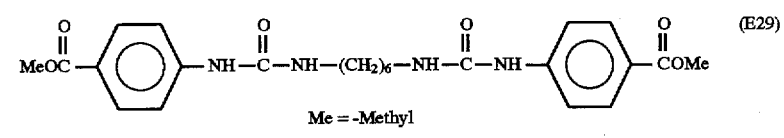
(E29) Me = -Methyl
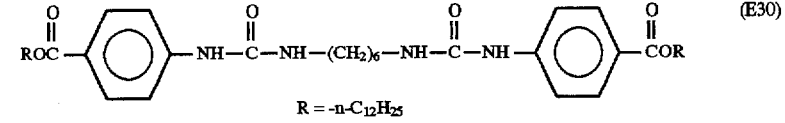
(E30) R = -n-C₁₂H₂₅
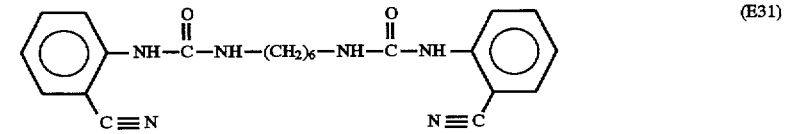
(E31)
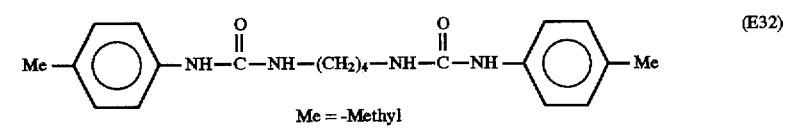
(E32) Me = -Methyl

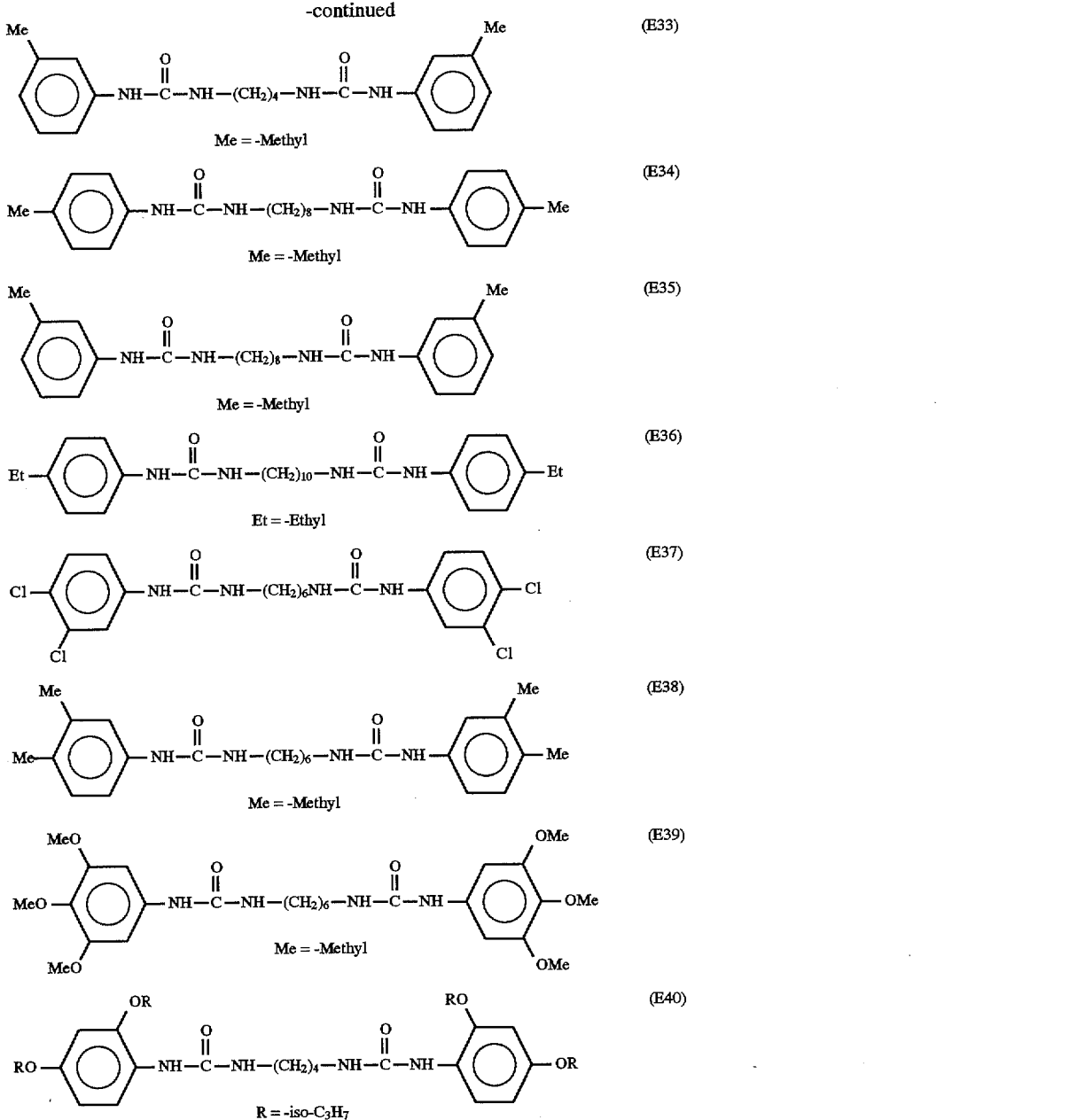

In the reversible multi-color thermal recording medium of the present invention, illustrative examples of the reversible heat-resistant color developer used in combination with the leuco dye include the following compounds represented by the general formula (I').

N-octadecyl-N'-(4-hydroxyphenyl)urea (E1')
N-octadecyl-N'-(3-hydroxyphenyl)urea (E2')
N-octadecyl-N'-(2-hydroxyphenyl)urea (E3')
N-octadecyl-N'-(4-hydroxy-2-methylphenyl)urea (E4')
N-octadecyl-N'-(2-hydroxy-4-methylphenyl)urea (E5')
N-octadecyl-N'-(4-hydroxy-2-nitrophenyl)urea (E6')
N-octadecyl-N'-(4-hydroxy-3-nitrophenyl)urea (E7')
N-octadecyl-N'-(3-hydroxy-4-methoxyphenyl)urea (E8')
N-octadecyl-N'-(5-hydroxy-2-methoxyphenyl)urea (E9')
N-octadecyl-N'-(4-chloro-2-hydroxyphenyl)urea (E10')
N-octadecyl-N'-(3-chloro-4-hydroxy-5-methylphenyl)urea (E11')
N-octadecyl-N'-(3,5-dichloro-4-hydroxyphenyl)urea (E12')
N-octadecyl-N'-(3,5-dibromo-4-hydroxyphenyl)urea (E13')
N-dodecyl-N'-(4-hydroxyphenyl)urea (E14')
N-dodecyl-N'-(3-hydroxyphenyl)urea (E15')
N-dodecyl-N'-(2-hydroxyphenyl)urea (E16')
N-dodecyl-N'-(4-hydroxy-2-methylphenyl)urea (E17')
N-dodecyl-N'-(4-hydroxy-3-nitrophenyl)urea (E18')
N-dodecyl-N'-(3-hydroxy-4-methoxyphenyl)urea (E19')
N-dodecyl-N'-(3-chloro-4-hydroxy-5-methylphenyl)urea (E20')
N-dodecyl-N'-(3,5-dichloro-4-hydroxyphenyl)urea (E21')
N-tetradecyl-N'-(4-hydroxyphenyl)urea (E22')
N-tetradecyl-N'-(3-hydroxyphenyl)urea (E23')
N-tetradecyl-N'-(2-hydroxyphenyl)urea (E24')
N-tetradecyl-N'-(4-hydroxy-2-methylphenyl)urea (E25')
N-tetradecyl-N'-(4-hydroxy-2-nitrophenyl)urea (E26')
N-tetradecyl-N'-(5-hydroxy-2-methoxyphenyl)urea (E27')
N-tetradecyl-N'-(3,5-dibromo-4-hydroxyphenyl)urea (E28')
N-hexadecyl-N'-(4-hydroxyphenyl)urea (E29')

N-hexadecyl-N'-(3-hydroxyphenyl)urea (E30')
N-hexadecyl-N'-(2-hydroxyphenyl)urea (E31')
N-hexadecyl-N'-(4-hydroxy-2-methylphenyl)urea (E32')
N-hexadecyl-N'-(4-hydroxy-2-nitrophenyl)urea (E33')
N-hexadecyl-N'-(5-hydroxy-2-methoxyphenyl)urea (E34')
N-hexadecyl-N'-(4-chloro-2-hydroxyphenyl)urea (E35')
N-hexadecyl-N'-(3-chloro-4-hydroxy-5-methylphenyl)urea (E36')
N-eicosyl-N'-(4-hydroxyphenyl)urea (E37')
N-eicosyl-N'-(3-hydroxyphenyl)urea (E38')
N-eicosyl-N'-(2-hydroxyphenyl)urea (E39')
N-eicosyl-N'-(4-hydroxy-2-methylphenyl)urea (E40')
N-eicosyl-N'-(4-hydroxy-2-nitrophenyl)urea (E41')
N-eicosyl-N'-(5-hydroxy-2-methoxyphenyl)urea (E42')
N-eicosyl-N'-(4-chloro-2-hydroxyphenyl)urea (E43')
N-eicosyl-N'-(3-chloro-4-hydroxy-5-methylphenyl)urea (E44')

In the reversible multi-color thermal recording medium of the present invention, the basic achromatic dye used in combination with the heat-resistant color developer is not limited to a particular kind, but triphenyl methane, fluoran, fluorene and divinyl-based dyes are preferred. Specific examples of these dyes are shown below. These dyes may be used alone or in combination of two or more.
<triphenylmethane-based leuco dyes>
3,3-bis(p-dimethylaminophenyl)-6-dimethylamino phthalide
[another name is crystal violet lactone]
<fluoran-based leuco dyes (I)>
3-diethylamino-6-methyl-7-anilinofluoran
3-(N-ethyl-p-toluidino)-6-methyl-7-anilinofluoran
3-(N-ethyl-N-isoamylamino)-6-methyl-7-anilinofluoran
3-diethylamino-6-methyl-7-(o,p-dimethylanilino)fluoran
3-pyrrolidino-6-methyl-7-anilinofluoran
3-piperidino-6-methyl-7-anilinofluoran
3-(N-cyclohexyl-N-methylamino)-6-methyl-7-anilinofluoran
3-diethylamino-7-(m-trifluoromethylanilino)fluoran
3-N-n-dibutylamino-6-methyl-7-anilinofluoran
3-N-n-dibutylamino-7-(o-chloroanilino)fluoran
3-(N-ethyl-N-tetrahydrofurfurylamino)-6-methyl-7-anilinofluoran
3-dibutylamino-6-methyl-7-(o,p-dimethylanilino)fluoran
3-(N-methyl-N-propylamino)-6-methyl-7-anilinofluoran
3-diethylamino-6-chloro-7-anilinofluoran
3-dibutylamino-7-(o-chloroanilino)fluoran
3-diethylamino-7-(o-chloroanilino)fluoran
3-diethylamino-6-methyl-chlorofluoran
3-diethylamino-6-methyl-fluoran
3-cyclohexylamino-6-chlorofluoran
3-diethylamino-benzo[a]-fluoran
3-n-dipentylamino-6-methyl-7-anilinofluoran
2-(4-oxo-hexyl)-3-dimethylamino-6-methyl-7-anilinofluoran
2-(4-oxo-hexyl)-3-diethylamino-6-methyl-7-anilinofluoran
2-(4-oxo-hexyl)-3-dipropylamino-6-methyl-7-anilinofluoran
<fluorene-based leuco dyes>
3,6,6'-tris(dimethylamino)spiro[fluorene-9,3'-phthalide]
3,6,6'-tris(diethylamino)spiro[fluorene-9,3'-phthalide]
<fluoran-based leuco dyes (II)>
2-methyl-6-p-(p-dimethylaminophenyl)aminoanilinofluoran
2-methoxy-6-p-(p-dimethylaminophenyl)aminoanilinofluoran
2-chloro-3-methyl-6-p-(p-phenylaminophenyl)aminoanilinofluoran
2-chloro-6-p-(p-dimethylaminophenyl)aminoanilinofluoran
2-nitro-6-p-(p-diethylaminophenyl)aminoanilinofluoran
2-amino-6-p-(p-diethylaminophenyl)aminoanilinofluoran
2-diethylamino-6-p-(p-diethylaminophenyl)aminoanilinofluoran
2-phenyl-6-methyl-6-p-(p-phenylaminophenyl)aminoanilinofluoran
2-benzyl-6-p-(p-phenylaminophenyl)aminoanilinofluoran
2-hydroxy-6-p-(p-phenylaminophenyl)aminoanilinofluoran
3-methyl-6-p-(p-dimethylaminophenyl)aminoanilinofluoran
3-diethylamino-6-p-(p-diethylaminophenyl)aminoanilinofluoran
3-diethylamino-6-p-(p-dibutylaminophenyl)aminoanilinofluoran
<divinyl-based leuco dyes>
3,3-bis-[2-(p-dimethylaminophenyl)-2-(p-methoxyphenyl)ethenyl]-4,5,6,7-tetrabromophthalide
3,3-bis-[2-(p-dimethylaminophenyl)-2-(p-methoxyphenyl)ethenyl]-4,5,6,7-tetrachlorophthalide
3,3-bis-[1,1-bis(4-pyrrolidinophenyl)ethylene-2-yl ]-4,5,6,7-tetrabromophthalide
3,3-bis-[1-(4-methoxyphenyl)-1-(4-pyrrolidinophenyl)ethylene-2-yl]-4,5,6,7-tetrachlorophthalide
<Others>
1,1-bis-[2',2',2",2"-tetrakis-(p-dimethylaminophenyl)ethenyl]-2,2-dinitrileethane
1,1-bis-[2',2',2",2"-tetrakis-(p-dimethylaminophenyl)ethenyl]-2,b-naphthoylethane
1,1-bis-[2',2',2",2"-tetrakis-(p-dimethylaminophenyl)ethenyl]-2,2-diacetylethane
bis-[2,2,2',2'-tetrakis-(p-dimethylaminophenyl)-ethenyl]-methyl malonate dimethyl In the present invention, as a sensitizer, an aliphatic amide such as amide stearate or amide palmitate, ethylene bisamide, montan wax, polyethylene wax, dibenzyl terephthalate, p-benzyl oxybenzyl benzoate, di-p-tolylcarbonate, p-benzyl biphenyl, phenyl α-naphthyl carbonate, 1,4-diethoxy naphthalene, 1-hydroxy-2-phenyl naphthoate, 1,2-di-(3-methylphenoxy)ethane, oxalic acid di(p-methylbenzyl), β-benzyloxynaphthalene, 4-biphenyl-p-tolylether, O-xylylene-bis-(phenylether), 4-(m-methylphenoxymethyl)biphenyl or the like may be added within the range that does not impair the effect of the invention.

In the present invention, when a plurality of reversible thermal recording layers and irreversible thermal recording layers are provided to prepare a multi-color recording medium, an intermediate layer of a resin is preferably interposed between the recording layers to be laminated together. The resin intermediate layer is intended to prevent the recording layers from being mixed together during heating and can be formed by applying a resin which does not melt at a recording temperature to the recording layers to be laminated together. The resin usable in the present invention may be of the same kind as a binder resin used in adjacent recording layers, but is preferably incompatible with the binder resin. Illustrative examples of the resin include polyvinyl alcohol, polyacrylamide, polyacrylate and polyamide resins and the like, but the resin is not limited to these. A multi-color thermal recording medium providing a vivid color tone can be obtained by providing a resin intermediate layer.

The resin intermediate layer may be thick enough not to be broken by application of heat and pressure due to repetitions of recording and erasure. If the resin intermediate layer is too thick, thermal conductivity deteriorates. Therefore, the thickness of the intermediate layer is preferably as small as possible and typically 10 μm or less.

The intermediate layer of the present invention may contain a filler. The filler used in the invention may be an organic or inorganic filler such as silica, calcium carbonate, kaolin, baked kaolin, diatomaceous earth, talc, titanium oxide or aluminum hydroxide. The weight ratio of the filler to the resin both constituting the intermediate layer is preferably 2:1 to 20:1.

Illustrative examples of the binder used in the reversible thermal recording layer and the irreversible thermal recording layer of the present invention include denatured polyvinyl alcohols such as wholly saponified polyvinyl alcohols having a polymerization degree of 200 to 1,900, partly saponified polyvinyl alcohols, carboxy-denatured polyvinyl alcohols, amide-denatured polyvinyl alcohols, sulfonic acid-denatured polyvinyl alcohols, butyral-denatured polyvinyl alcohols and other denatured polyvinyl alcohols, hydroxyethyl cellulose, methyl cellulose, carboxymethyl cellulose, styrene-maleic anhydride copolymer, styrene-butadiene copolymer and cellulose derivatives such as ethyl cellulose and acetyl cellulose, polyvinyl chloride, polyvinyl acetate, polyacrylamide, polyacrylate, polyvinyl butyral polystyrol and copolymers thereof, polyamide resins, silicon resins, petroleum resins, terpene resins, ketone resins and cumarone resins. These high molecular substances may be dissolved in a solvent such as water, alcohol, ketone, ester or hydrocarbon, emulsified in water or other solvent, or dispersed like a paste, and may be combined in accordance with required quality.

The filler used in the reversible thermal recording layer and the irreversible thermal recording layer of the present invention may be an organic or inorganic filler such as silica, calcium carbonate, kaolin, baked kaolin, diatomaceous earth, talc, titanium oxide and aluminum hydroxide.

In addition to these, a release agent such as an aliphatic acid metal salt, a lubricant such as wax, a water-proof agent such as glyoxal, a dispersant, an anti-foaming agent and the like can be contained in the recording layers.

Further, an overcoat layer of a high molecular substance containing a filler may be formed on a thermal color developing layer for the purpose of improving keeping quality.

Moreover, an undercoat layer containing an organic or inorganic filler may be formed under the thermal color developing layer for the purpose of improving keeping quality and sensitivity.

The above organic color developer, basic achromatic dye and materials added as required are ground with a grinder such as a ball mill, attritor or sand grinder or an appropriate emulsifier until a particle diameter of 1 μm or less is achieved. The resulting particles are mixed with a binder and various additives according to application purpose to prepare a coating fluid.

The amounts of the organic color developer and the basic achromatic dye used in the present invention and the kinds and amounts of other components are determined according to required performance and recording quality and not limited particularly. Typically, 1 to 8 parts of the organic color developer and 1 to 20 parts of the filler are used based on 1 part of the basic achromatic dye and 10 to 25% of the binder is used based on the total solid content.

To fabricate the reversible multi-color thermal recording medium of the present invention, the thermal coating fluid and the intermediate layer coating fluid having the above compositions are applied alternately to a desired support such as paper, synthetic paper, plastic film or nonwoven fabric and dried to prepare a multi-layered laminate. In this way, the reversible multi-color thermal recording medium of interest can be obtained.

A light absorbent which absorbs light with its thermal recording layer or the like and converts it into heat can be contained in the reversible multi-color thermal recording medium of the present invention to produce an optical recording medium. The light absorbent used in the recording medium of the present invention to convert light into heat may be any kind of substance provided it absorbs the wavelength of light comingfrom diverse light sources. Various dyes, various pigments, near infrared light absorbents may be used as the light absorbent of the present invention. However, the light absorbent of the present invention is not particularly limited.

When a strobe having a continuous light wavelength is used as a recording light source, for example, a product obtained from a heat reaction between a thiourea derivative and a copper compound as disclosed in Japanese Patent Publication No. 2-206583 and the specification of JP-A-5-30954, graphite, copper sulfide, lead sulfide, molybdenum trisulfide, black titanium and the like as disclosed in Japanese Patent Publication No. 3-86580 may be used as the light absorbent which converts light into heat. In addition to these, carbon black may be used as the light absorbent. These light absorbents may also be used as light absorbents for laser recording.

When a semiconductor laser which is excellent in terms of size, safety, price and modulation is used as a recording laser, particularly when a semiconductor laser having an oscillation wavelength in visible to near infrared ranges is used, examples of a material which absorbs such an oscillation wavelength include polymethine coloring matters (cyanine coloring matters), azulenium coloring matters, pyrylium coloring matters, thiopyrylium coloring matters, squalenium coloring matters, croconium coloring matters, dithiol metal complex salt coloring matters, mercaptophenol metal complex coloring matters, mercaptonaphthol metal complex coloring matters, phthalocyanine coloring matters, naphthalocyanine coloring matters, triallyl methane coloring matters, inunonium coloring matters, diimmonium coloring matters, naphthoquinone coloring matters, anthraquinone coloring matters, metal complex salt coloring matters and the like as disclosed in JP-A-54-4142, JP-A-58-94494, JP-A-58-209594, JP-A-2-217287, Japanese Patent Publication No. 3-73814, "Near Infrared Absorbing Coloring Matters" (Chemical Industry No. 43 issued in May 1986) and the like.

Illustrative examples of the polymethine coloring matters (cyanine coloring matters) include Indocyanine Green (manufactured of Daiichi Pharmaceutical Co.), NK-2014 (manufactured by Nippon Kanko Shikiso Kenkyujo Co.), NK-2612 (manufactured by Nippon Kanko Shikiso Kenkyujo Co.), 1,1,5,5-tetrakis(p-dimethylaminophenyl)-3-methoxy-1,4-pentadiene, 1,1,5,5-tetrakis(p-diethylaminophenyl)-3-methoxy-1,4-pentadiene and the like. Examples of the squalenium coloring matters include NK-2772 (manufactured by Nippon Kanko Shikiso Kenkyujo Co.) and the like. Examples of the dithiol metal complex salt coloring matters include toluene dithiol nickel complex, 4-tert-butyl-1,2-benzene dithiol nickel complex, bisdithiobenzyl nickel complex, PA-1005 (manufactured by Mitsui Toatsu Senryo Co.), PA-1006 (manufactured by Mitsui Toatsu Senryo Co.), bis(4-ethyldithiobenzyl) nickel complex disclosed in the specification of JP-A-4-80646, bis(4-n-propyldithiobenzyl)nickel complex and the like. Examples of the immonium coloring matters and the diimmonium coloring matters include IRG002 (manufactured by Nippon Kayaku Co.), IRG022 (manufactured by Nippon Kayaku Co.) and the like. Examples of the naphthalocyanine N-hexadecyl-N'-(3-hydroxyphenyl)urea (E30')
N-hexadecyl-N'-(2-hydroxyphenyl)urea (E31')
N-hexadecyl-N'-(4-hydroxy-2-methylphenyl)urea (E32')
N-hexadecyl-N'-(4-hydroxy-2-nitrophenyl)urea (E33')
N-hexadecyl-N'-(5-hydroxy-2-methoxyphenyl)urea (E34')
N-hexadecyl-N'-(4-chloro-2-hydroxyphenyl)urea (E35')
N-hexadecyl-N'-(3-chloro-4-hydroxy-5-methylphenyl)urea (E36')
N-eicosyl-N'-(4-hydroxyphenyl)urea (E37')
N-eicosyl-N'-(3-hydroxyphenyl)urea (E38')
N-eicosyl-N'-(2-hydroxyphenyl)urea (E39')
N-eicosyl-N'-(4-hydroxy-2-methylphenyl)urea (E40')
N-eicosyl-N'-(4-hydroxy-2-nitrophenyl)urea (E41')
N-eicosyl-N'-(5-hydroxy-2-methoxyphenyl)urea (E42')
N-eicosyl-N'-(4-chloro-2-hydroxyphenyl)urea (E43')
N-eicosyl-N'-(3-chloro-4-hydroxy-5-methylphenyl)urea (E44')

In the reversible multi-color thermal recording medium of the present invention, the basic achromatic dye used in combination with the heat-resistant color developer is not limited to a particular kind, but triphenyl methane, fluoran, fluorene and divinyl-based dyes are preferred. Specific examples of these dyes are shown below. These dyes may be used alone or in combination of two or more.

<triphenylmethane-based leuco dyes>
3,3-bis(p-dimethylaminophenyl)-6-dimethylamino phthalide
[another name is crystal violet lactone]
<fluoran-based leuco dyes (I)>
3-diethylamino-6-methyl-7-anilinofluoran
3-(N-ethyl-p-toluidino)-6-methyl-7-anilinofluoran
3-(N-ethyl-N-isoamylamino)-6-methyl-7-anilinofluoran
3-diethylamino-6-methyl-7-(o,p-dimethylanilino)fluoran
3-pyrrolidino-6-methyl-7-anilinofluoran
3-piperidino-6-methyl-7-anilinofluoran
3-(N-cyclohexyl-N-methylamino)-6-methyl-7-anilinofluoran
3-diethylamino-7-(m-trifluoromethylanilino)fluoran
3-N-n-dibutylamino-6-methyl-7-anilinofluoran
3-N-n-dibutylamino-7-(o-chloroanilino)fluoran
3-(N-ethyl-N-tetrahydrofurfurylamino)-6-methyl-7-anilinofluoran
3-dibutylamino-6-methyl-7-(o,p-dimethylanilino)fluoran
3-(N-methyl-N-propylamino)-6-methyl-7-anilinofluoran
3-diethylamino-6-chloro-7-anilinofluoran
3-dibutylamino-7-(o-chloroanilino)fluoran
3-diethylamino-7-(o-chloroanilino)fluoran
3-diethylamino-6-methyl-chlorofluoran
3-diethylamino-6-methyl-fluoran
3-cyclohexylamino-6-chlorofluoran
3-diethylamino-benzo[a]-fluoran
3-n-dipentylamino-6-methyl-7-anilinofluoran
2-(4-oxo-hexyl)-3-dimethylamino-6-methyl-7-anilinofluoran
2-(4-oxo-hexyl)-3-diethylamino-6-methyl-7-anilinofluoran
2-(4-oxo-hexyl)-3-dipropylamino-6-methyl-7-anilinofluoran
<fluorene-based leuco dyes>
3,6,6'-tris(dimethylamino)spiro[fluorene-9,3'-phthalide]
3,6,6'-tris(diethylamino)spiro[fluorene-9,3'-phthalide]
<fluoran-based leuco dyes (II)>
2-methyl-6-p-(p-dimethylaminophenyl)aminoanilinofluoran
2-methoxy-6-p-(p-dimethylaminophenyl)aminoanilinofluoran
2-chloro-3-methyl-6-p-(p-phenylaminophenyl)aminoanilinofluoran
2-chloro-6-p-(p-dimethylaminophenyl)aminoanilinofluoran
2-nitro-6-p-(p-diethylaminophenyl)aminoanilinofluoran
2-amino-6-p-(p-diethylaminophenyl)aminoanilinofluoran
2-diethylamino-6-p-(p-diethylaminophenyl)aminoanilinofluoran
2-phenyl-6-methyl-6-p-(p-phenylaminophenyl)aminoanilinofluoran
2-benzyl-6-p-(p-phenylaminophenyl)aminoanilinofluoran
2-hydroxy-6-p-(p-phenylaminophenyl)aminoanilinofluoran
3-methyl-6-p-(p-dimethylaminophenyl)aminoanilinofluoran
3-diethylamino-6-p-(p-diethylaminophenyl)aminoanilinofluoran
3-diethylamino-6-p-(p-dibutylaminophenyl)aminoanilinofluoran
<divinyl-based leuco dyes>
3,3-bis-[2-(p-dimethylaminophenyl)-2-(p-methoxyphenyl)ethenyl]-4,5,6,7-tetrabromophthalide
3,3-bis-[2-(p-dimethylaminophenyl)-2-(p-methoxyphenyl)ethenyl]-4,5,6,7-tetrachlorophthalide
3,3-bis-[1,1-bis(4-pyrrolidinophenyl)ethylene-2-yl ]-4,5,6,7-tetrabromophthalide
3,3-bis-[1-(4-methoxyphenyl)-1-(4-pyrrolidinophenyl)ethylene-2-yl]-4,5,6,7-tetrachlorophthalide
<Others>
1,1-bis-[2',2',2",2"-tetrakis-(p-dimethylaminophenyl)ethenyl]-2,2-dinitrileethane
1,1-bis-[2',2',2",2"-tetrakis-(p-dimethylaminophenyl)ethenyl]-2,b-naphthoylethane
1,1-bis-[2',2',2",2"-tetrakis-(p-dimethylaminophenyl)ethenyl]-2,2-diacetylethane
bis-[2,2,2',2'-tetrakis-(p-dimethylaminophenyl)-ethenyl]-methyl malonate dimethyl In the present invention, as a sensitizer, an aliphatic amide such as amide stearate or amide palmitate, ethylene bisamide, montan wax, polyethylene wax, dibenzyl terephthalate, p-benzyl oxybenzyl benzoate, di-p-tolylcarbonate, p-benzyl biphenyl, phenyl α-naphthyl carbonate, 1,4-diethoxy naphthalene, 1-hydroxy-2-phenyl naphthoate, 1,2-di-(3-methylphenoxy)ethane, oxalic acid di(p-methylbenzyl), β-benzyloxynaphthalene, 4-biphenyl-p-tolylether, O-xylylene-bis-(phenylether), 4-(m-methylphenoxymethyl)biphenyl or the like may be added within the range that does not impair the effect of the invention.

In the present invention, when a plurality of reversible thermal recording layers and irreversible thermal recording layers are provided to prepare a multi-color recording medium, an intermediate layer of a resin is preferably interposed between the recording layers to be laminated together. The resin intermediate layer is intended to prevent the recording layers from being mixed together during heating and can be formed by applying a resin which does not melt at a recording temperature to the recording layers to be laminated together. The resin usable in the present invention may be of the same kind as a binder resin used in adjacent recording layers, but is preferably incompatible with the binder resin. Illustrative examples of the resin include polyvinyl alcohol, polyacrylamide, polyacrylate and polyamide resins and the like, but the resin is not limited to these. A multi-color thermal recording medium providing a vivid color tone can be obtained by providing a resin intermediate layer.

The resin intermediate layer may be thick enough not to be broken by application of heat and pressure due to repetitions of recording and erasure. If the resin intermediate layer is too thick, thermal conductivity deteriorates. Therefore, the thickness of the intermediate layer is preferably as small as possible and typically 10 μm or less.

tion. For instance, in the case of a reversible double-color thermal recording medium, an irreversible thermal composition comprising a basic achromatic dye (developing red color) and an irreversible heat-resistant color developer as main components, an intermediate layer, and a reversible thermal composition comprising a basic achromatic dye (developing black color) and a reversible heat-resistant color developer as main components are laminated on the support in the order named. When heat energy is applied to the reversible multi-color thermal recording medium by a thermal head, a color developing thermal reaction occurs in each layer and a mixture of black and red colors, that is, reddish black color, is obtained. On the other hand, when this color developing recording medium is subjected to heat treatment with a heated roll or thermal lamination, a decolorization reaction is instantaneously caused by the basic achromatic dye (developing black color) and the reversible heat-resistant color developer. As the result, red color developed by the irreversible thermal composition remains.

Further, as for color development and decolorization, a structural change (keto-enol tautomerism) represented by the following formulae may occur in the urea and thiourea derivatives of the present invention depending on conditions. It is considered that these compounds need to have an enol-form structure in order to function as color developers. To cause keto-to-enol tautomerism, high temperatures obtained by a thermal head are required and, at the same time, tautomerism to keto form occurs when an appropriate temperature and an appropriate amount of heat are given, resulting in decolorization.

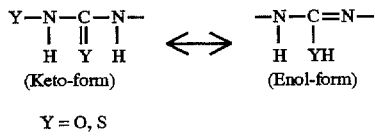

Y = O, S

Meanwhile, when a red color developing thermal recording layer, an intermediate layer and a black color developing thermal recording layer are laminated on the support in the order named, using conventional bisphenol A as a color developer, a color developing thermal reaction occurs in each layer with heat energy applied by a thermal head, and reddish black color, a mixture of black and red colors, is obtained. However, when this color developing recording medium is subjected to heat treatment with a heated roll or to thermal lamination, the hue of image portions does not change and reddish black color is markedly developed on the entire ground because bisphenol A is not a reversible heat-resistant color developer.

The reason that the urea and thiourea derivatives which are heat-resistant color developers of the present invention function as color developers for a dye precursor used in thermal recording media and optical recording media, the reason that a thermal recording medium comprising a dye precursor and the color developer of the present invention exhibits extremely high heat resistance, and the reason that an optical recording medium comprising a dye precursor, the color developer of the present invention and a light absorbent can undergo heat treatment with a heated roll or thermal lamination and exhibits extremely high heat resistance are not elucidated yet, but can be considered as follows.

In the case of the above thermal recording, since a thermal head is instantaneously heated to a temperature of 200° to 300° C., the urea and thiourea derivatives contained in the recording layer of the thermal recording medium which is brought into contact with the thermal head undergo tautomerism to be converted into enol form and to exhibit a color developing function. It is considered that the lactone ring of the dye precursor is thereby cleaved, with the result of color development.

Further, in the case of the above optical recording, since a light absorbent is contained in the optical recording layer, light irradiated from a recording light source is absorbed efficiently and converted into heat by this light absorbent. As the temperature is elevated to 200° to 300° C. instantaneously at this point, the urea and thiourea derivatives contained in the recording layer undergo tautomerism to be converted into enol form and to exhibit a color developing function, as in the above thermal recording. It is considered that the lactone ring of the dye precursor is thereby cleaved with the result of color development.

The urea and thiourea derivatives do not exhibit a color developing function at temperatures at which they do not change into enol form. Since a reaction with the dye precursor does not occur, the color development of the ground does not take place. This seems to be the reason why heat resistance is high. The temperature at which the urea and thiourea derivatives are converted into enol form is considered to be higher than a temperature required for heat treatment with a heated roll and thermal lamination. For this reason, the color development of the ground does not take place in high-temperature thermal environment such as heat treatment with a heated roll and thermal lamination.

Further, in the case of an optical recording medium structured above and subjected to thermal lamination, light irradiated from a recording light source transmits through a plastic film present on the optical recording layer, reaches the light absorbent contained in the optical recording layer, and is converted into heat. Therefore, additional recording is possible even after lamination.

Other and further objects, features and advantages of the invention will become clear from the following description.

The present invention is further illustrated with reference to the following examples. The term "parts" used herein means "parts by weight".

<production of reversible multi-color thermal recording media: Examples 1 to 80 and Comparative Examples 1 to 10>

[Examples 1 to 20] [Examples 1' to 20']

Formation of irreversible thermal recording layer Solution A (dispersion of irreversible heat-resistant color developer)

| | |
|---|---|
| irreversible heat-resistance color developer (see Tables 1 and 1') | 6.0 parts |
| 10% polyvinyl alcohol aqueous solution | 18.8 parts |
| water | 11.2 parts |

Solution B (dispersion of dye developing red color)

| | |
|---|---|
| 3,3-bis(1-ethyl-2-methylindole-3-yl)phthalide | 2.0 parts |
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare a thermal layer coating fluid.

| | |
|---|---|
| solution A | 36.0 parts |
| solution B | 9.2 parts |
| kaolin clay (50% dispersion) | 12.0 parts |

The above coating fluid was applied to one side of a 50 g/m² substrate in a coating weight of 5.0 g/m². The coating was then dried to form an irreversible thermal recording layer.

Formation of intermediate layer

| | |
|---|---|
| kaolin clay (50% dispersion) | 12.0 parts |
| 10% polyvinyl alcohol aqueous solution | 6.0 parts |
| water | 3.0 parts |

The solutions having the above compositions were mixed to prepare an intermediate layer coating fluid.

The intermediate layer coating fluid was applied to the above irreversible thermal recording layer in a coating weight of 3.0 g/m². The coating was then dried to form an intermediate layer.

Formation of reversible thermal recording layer Solution D (dispersion of reversible heat-resistant color developer)

| | |
|---|---|
| reversible heat-resistant color developer (see Tables 1 and 1') | 6.0 parts |
| 10% polyvinyl alcohol aqueous solution | 18.8 parts |
| water | 11.2 parts |

Solution E (dispersion of dye developing black color)

| | |
|---|---|
| 3-n-dipentylamino-6-methyl-7-anilinofluoran | 2.0 parts |
| 10% polyvinyl alcohol aqueous solution | 4.6 parts |
| water | 2.6 parts |

The solutions having the above compositions were ground to an average particle diameter of 1 µm with a sand grinder. Subsequently, the resulting dispersions were mixed in the proportion below to prepare a thermal layer coating fluid.

| | |
|---|---|
| solution D | 36.0 parts |
| solution E | 9.2 parts |
| kaolin clay (50% dispersion) | 12.0 parts |

The above coating fluid was applied to the intermediate layer in a coating weight of 5.0 g/m². The coating was then dried to form a reversible thermal recording layer. This sheet was treated with a supercalender to achieve a smoothness of 600 to 700 seconds so as to prepare a reversible multi-color thermal recording sheet.

[Examples 21 to 40] [Examples 21' to 40']

Formation of reversible thermal recording layer Solution D (dispersion of reversible heat-resistant color developer)

| | |
|---|---|
| reversible heat-resistant color developer (see Tables 2 and 2') | 6.0 parts |
| 10% polyvinyl alcohol aqueous solution | 18.8 parts |
| water | 11.2 parts |

Solution E (dispersion of dye developing black color)

| | |
|---|---|
| 3-n-dipentylamino-6-methyl-7-anilinofluoran | 2.0 parts |
| 10% polyvinyl alcohol aqueous solution | 4.6 parts |
| water | 2.6 parts |

The solutions having the above compositions were ground to an average particle diameter of 1 µm with a sand grinder. Subsequently, the resulting dispersions were mixed in the proportion below to prepare a thermal recording layer coating fluid.

| | |
|---|---|
| solution D | 36.0 parts |
| solution E | 9.2 parts |
| kaolin clay (50% dispersion) | 12.0 parts |

The above coating fluid was applied to one side of a 50 g/m² substrate in a coating weight of 5.0 g/m². The coating was then dried to form a reversible thermal recording layer.

Formation of intermediate layer

| | |
|---|---|
| kaolin clay (50% dispersion) | 12.0 parts |
| 10% polyvinyl alcohol aqueous solution | 6.0 parts |
| water | 3.0 parts |

The solutions having the above compositions were mixed to prepare an intermediate layer coating fluid.

The intermediate layer coating fluid was applied to the above reversible thermal recording layer in a coating weight of 3.0 g/m². The coating was then dried to form an intermediate layer.

Formation of irreversible thermal recording layer Solution A (dispersion of irreversible heat-resistant color developer)

| | |
|---|---|
| irreversible heat-resistant color developer (see Tables 2 and 2') | 6.0 parts |
| 10% polyvinyl alcohol aqueous solution | 18.8 parts |
| water | 11.2 parts |

Solution F (dispersion of dye developing blue color)

| | |
|---|---|
| 3,3-bis(p-dimethylaminophenyl)-6-dimethylaminophthalide | 2.0 parts |
| 10% polyvinyl alcohol aqueous solution | 4.6 parts |
| water | 2.6 parts |

The solutions having the above compositions were ground to an average particle diameter of 1 µm with a sand grinder. Subsequently, the resulting dispersions were mixed in the proportion below to prepare a thermal recording layer coating fluid.

| | |
|---|---|
| solution A | 36.0 parts |
| solution F | 9.2 parts |
| kaolin clay (50% dispersion) | 12.0 parts |

The above coating fluid was applied to the intermediate layer in a coating weight of 5.0 g/m². The coating was then dried to form an irreversible thermal recording layer. This sheet was treated with a supercalender to achieve a smoothness of 600 to 700 seconds so as to form a reversible multi-color thermal recording sheet.

Comparative Examples 1 to 5]
Formation of thermal recording layer Solution G (dispersion of conventional color developer) conventional color developer (see Table 3)

| conventional color developer (see Table 3) | 6.0 parts |
|---|---|
| 10% polyvinyl alcohol aqueous solution | 18.8 parts |
| water | 11.2 parts |

Solution B (dispersion of dye developing red color)

| 3,3-bis(1-ethyl-2-methyl-indole-3-yl)phthalide | 2.0 parts |
|---|---|
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare a thermal recording layer coating fluid.

| solution G | 36.0 parts |
|---|---|
| solution B | 9.2 parts |
| kaolin clay (50% dispersion) | 12.0 parts |

The above coating fluid was applied to one side of a 50 g/m² substrate in a coating weight of 5.0 g/m². The coating was then dried to form a thermal recording layer.
Formation of intermediate layer

| kaolin clay (50% dispersion) | 12.0 parts |
|---|---|
| 10% polyvinyl alcohol aqueous solution | 6.0 parts |
| water | 3.0 parts |

The solutions having the above compositions were mixed to prepare an intermediate layer coating fluid.

The intermediate layer coating fluid was applied to the above thermal recording layer in a coating weight of 3.0 g/m². The coating was then dried to form an intermediate layer.
Formation of thermal recording layer Solution H (dispersion of conventional color developer)

| conventional color developer (see Table 3) | 6.0 parts |
|---|---|
| 10% polyvinyl alcohol aqueous solution | 18.8 parts |
| water | 11.2 parts |

Solution E (dispersion of dye developing black color)

| 3-n-dipentylamino-6-methyl-7-anilinofluoran | 2.0 parts |
|---|---|
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare a thermal recording layer coating fluid.

| solution H | 36.0 parts |
|---|---|
| solution E | 9.2 parts |
| kaolin clay (50% dispersion) | 12.0 parts |

The above coating fluid was applied to the intermediate layer in a coating weight of 5.0 g/m². The coating was then dried to form a thermal recording layer. This sheet was treated with a supercalender to achieve a smoothness of 600 to 700 seconds so as to prepare a thermal recording sheet.

A quality performance test was made on the thermal recording sheets obtained in the above Examples and Comparative Examples and results are shown in Tables 1 to 3.

Note (1) thermal recording: Using a printer for the Rupo-90FII personal wordprocessor (manufactured by Toshiba), thermal recording was made on the reversible multi-color thermal recording media with the maximum application energy (the same conditions were also employed for thermal recording shown below). The densities of image and ground portions were measured by a Macbeth densitometer (RD-914 with an amber filter, the same conditions were employed hereinafter). Developed color tones were determined visually.

Note (2) decolorization (by a heated roll): The reversible multi-color thermal recording media on which dynamic recording was made by the method of Note (1) were fed through a roll heated to 115° C. at a speed of 7 mm/second and the densities of image and ground portions were measured. As for the ground portions, the smaller the Macbeth density values the more stable the color of the ground portions becomes. Contrast between image and ground portions of a thermally recorded portion which was subjected to heat treatment with a heated roll was evaluated as follows. Thermal recording media whose contrasts were rated Δ to X are difficult to read.

o ... no or almost no color development of ground portions
Δ ... color development of ground portion
X ... marked color development of ground portions Note (3) thermal recording: Using a printer for the Rupo-90FII wordprocessor (manufactured by Toshiba), thermal recording was made on color undeveloped portions of reversible multi-color thermal recording media with the maximum application energy after heat treatment with a heated roll. Developed color tones were determined visually.

TABLE 1

Results of quality performance test

| | irreversible color developer | reversible color developer | thermal recording (1) Image portions | Ground portions | Color tone | Decolorization (with heated roll) (2) Image portions | Ground portions | Contrast | Color tone | thermal recording (3) Image portions | Color tone |
|---|---|---|---|---|---|---|---|---|---|---|---|
| Example 1 | Compound A1 | Compound E6 | 1.30 | 0.04 | reddish black | 0.43 | 0.04 | ○ | red | 1.30 | reddish black |
| Example 2 | Compound A25 | Compound E1 | 1.29 | 0.04 | " | 0.42 | 0.04 | ○ | " | 1.29 | " |
| Example 3 | Compound A2 | Compound E2 | 1.30 | 0.04 | " | 0.41 | 0.04 | ○ | " | 1.30 | " |
| Example 4 | Compound A3 | Compound E3 | 1.28 | 0.04 | " | 0.42 | 0.04 | ○ | " | 1.28 | " |
| Example 5 | Compound A4 | Compound E4 | 1.30 | 0.04 | " | 0.40 | 0.04 | ○ | " | 1.30 | " |
| Example 6 | Compound A5 | Compound E5 | 1.29 | 0.04 | " | 0.39 | 0.04 | ○ | " | 1.29 | " |
| Example 7 | Compound A6 | Compound E7 | 1.31 | 0.04 | " | 0.43 | 0.04 | ○ | " | 1.31 | " |
| Example 8 | Compound A7 | Compound E8 | 1.27 | 0.04 | " | 0.43 | 0.04 | ○ | " | 1.27 | " |
| Example 9 | Compound A8 | Compound E9 | 1.30 | 0.04 | " | 0.45 | 0.04 | ○ | " | 1.30 | " |
| Example 10 | Compound A9 | Compound E10 | 1.28 | 0.04 | " | 0.43 | 0.04 | ○ | " | 1.28 | " |
| Example 11 | Compound A10 | Compound E1 | 1.27 | 0.04 | " | 0.42 | 0.04 | ○ | " | 1.27 | " |
| Example 12 | Compound A11 | Compound E2 | 1.31 | 0.04 | " | 0.41 | 0.04 | ○ | " | 1.31 | " |
| Example 13 | Compound A12 | Compound E3 | 1.32 | 0.04 | " | 0.43 | 0.04 | ○ | " | 1.32 | " |
| Example 14 | Compound A13 | Compound E4 | 1.30 | 0.04 | " | 0.44 | 0.04 | ○ | " | 1.30 | " |
| Example 15 | Compound A14 | Compound E5 | 1.29 | 0.04 | " | 0.42 | 0.04 | ○ | " | 1.29 | " |
| Example 16 | Compound A15 | Compound E6 | 1.27 | 0.04 | " | 0.40 | 0.04 | ○ | " | 1.27 | " |
| Example 17 | Compound A16 | Compound E7 | 1.28 | 0.04 | " | 0.39 | 0.04 | ○ | " | 1.28 | " |
| Example 18 | Compound A17 | Compound E8 | 1.29 | 0.04 | " | 0.41 | 0.04 | ○ | " | 1.29 | " |
| Example 19 | Compound A18 | Compound E9 | 1.30 | 0.04 | " | 0.42 | 0.04 | ○ | " | 1.30 | " |
| Example 20 | Compound A19 | Compound E10 | 1.31 | 0.04 | " | 0.43 | 0.04 | ○ | " | 1.31 | " |
| Example 1' | Compound A1 | Compound E6' | 1.31 | 0.04 | " | 0.41 | 0.04 | ○ | " | 1.31 | " |
| Example 2' | Compound A25 | Compound E1' | 1.32 | 0.04 | " | 0.43 | 0.04 | ○ | " | 1.32 | " |
| Example 3' | Compound A2 | Compound E2' | 1.30 | 0.04 | " | 0.44 | 0.04 | ○ | " | 1.30 | " |
| Example 4' | Compound A3 | Compound E3' | 1.29 | 0.04 | " | 0.42 | 0.04 | ○ | " | 1.29 | " |
| Example 5' | Compound A4 | Compound E4' | 1.27 | 0.04 | " | 0.40 | 0.04 | ○ | " | 1.27 | " |
| Example 6' | Compound A5 | Compound E5' | 1.28 | 0.04 | " | 0.39 | 0.04 | ○ | " | 1.28 | " |
| Example 7' | Compound A6 | Compound E7' | 1.29 | 0.04 | " | 0.41 | 0.04 | ○ | " | 1.29 | " |
| Example 8' | Compound A7 | Compound E8' | 1.30 | 0.04 | " | 0.42 | 0.04 | ○ | " | 1.30 | " |
| Example 9' | Compound A8 | Compound E9' | 1.31 | 0.04 | " | 0.43 | 0.04 | ○ | " | 1.31 | " |
| Example 10' | Compound A9 | Compound E10' | 1.30 | 0.04 | " | 0.43 | 0.04 | ○ | " | 1.30 | " |
| Example 11' | Compound A10 | Compound E1' | 1.29 | 0.04 | " | 0.42 | 0.04 | ○ | " | 1.29 | " |
| Example 12' | Compound A11 | Compound E2' | 1.30 | 0.04 | " | 0.41 | 0.04 | ○ | " | 1.30 | " |
| Example 13' | Compound A12 | Compound E3' | 1.28 | 0.04 | " | 0.42 | 0.04 | ○ | " | 1.28 | " |
| Example 14' | Compound A13 | Compound E4' | 1.30 | 0.04 | " | 0.40 | 0.04 | ○ | " | 1.30 | " |
| Example 15' | Compound A14 | Compound E5' | 1.29 | 0.04 | " | 0.39 | 0.04 | ○ | " | 1.29 | " |
| Example 16' | Compound A15 | Compound E6' | 1.31 | 0.04 | " | 0.43 | 0.04 | ○ | " | 1.31 | " |
| Example 17' | Compound A16 | Compound E7' | 1.27 | 0.04 | " | 0.43 | 0.04 | ○ | " | 1.27 | " |
| Example 18' | Compound A17 | Compound E8' | 1.30 | 0.04 | " | 0.45 | 0.04 | ○ | " | 1.30 | " |
| Example 19' | Compound A18 | Compound E9' | 1.28 | 0.04 | " | 0.43 | 0.04 | ○ | " | 1.28 | " |
| Example 20' | Compound A19 | Compound E10' | 1.27 | 0.04 | " | 0.42 | 0.04 | ○ | " | 1.27 | " |

TABLE 2

Results of quality performance test

| | irreversible color developer | reversible color developer | thermal recording (1) Image portions | Ground portions | Color tone | Decolorization (with heated roll) (2) Image portions | Ground portions | Contrast | Color tone | thermal recording (3) Image portions | Color tone |
|---|---|---|---|---|---|---|---|---|---|---|---|
| Example 21 | Compound B1 | Compound E6 | 1.25 | 0.04 | bluish black | 1.01 | 0.04 | ○ | blue | 1.25 | bluish black |
| Example 22 | Compound B2 | Compound E11 | 1.24 | 0.04 | " | 1.02 | 0.04 | ○ | " | 1.24 | " |
| Example 23 | Compound B3 | Compound E12 | 1.25 | 0.04 | " | 1.03 | 0.04 | ○ | " | 1.25 | " |
| Example 24 | Compound B4 | Compound E13 | 1.23 | 0.04 | " | 1.03 | 0.04 | ○ | " | 1.23 | " |
| Example 25 | Compound B5 | Compound E14 | 1.24 | 0.04 | " | 1.03 | 0.04 | ○ | " | 1.24 | " |
| Example 26 | Compound B6 | Compound E15 | 1.26 | 0.04 | " | 1.01 | 0.04 | ○ | " | 1.26 | " |
| Example 27 | Compound B7 | Compound E16 | 1.25 | 0.04 | " | 1.02 | 0.04 | ○ | " | 1.25 | " |
| Example 28 | Compound B8 | Compound E17 | 1.24 | 0.04 | " | 1.00 | 0.04 | ○ | " | 1.24 | " |
| Example 29 | Compound B9 | Compound E18 | 1.23 | 0.04 | " | 1.02 | 0.04 | ○ | " | 1.23 | " |
| Example 30 | Compound B10 | Compound E19 | 1.24 | 0.04 | " | 1.03 | 0.04 | ○ | " | 1.24 | " |
| Example 31 | Compound B11 | Compound E6 | 1.25 | 0.04 | " | 1.01 | 0.04 | ○ | " | 1.25 | " |
| Example 32 | Compound B12 | Compound E11 | 1.23 | 0.04 | " | 1.01 | 0.04 | ○ | " | 1.23 | " |
| Example 33 | Compound B13 | Compound E12 | 1.22 | 0.04 | " | 1.01 | 0.04 | ○ | " | 1.22 | " |
| Example 34 | Compound B14 | Compound E13 | 1.21 | 0.04 | " | 1.03 | 0.04 | ○ | " | 1.21 | " |
| Example 35 | Compound B15 | Compound E14 | 1.25 | 0.04 | " | 1.03 | 0.04 | ○ | " | 1.25 | " |
| Example 36 | Compound B16 | Compound E15 | 1.26 | 0.04 | " | 1.02 | 0.04 | ○ | " | 1.26 | " |
| Example 37 | Compound B17 | Compound E16 | 1.27 | 0.04 | " | 1.02 | 0.04 | ○ | " | 1.27 | " |
| Example 38 | Compound B18 | Compound E17 | 1.26 | 0.04 | " | 1.03 | 0.04 | ○ | " | 1.26 | " |
| Example 39 | Compound B19 | Compound E18 | 1.26 | 0.04 | " | 1.03 | 0.04 | ○ | " | 1.26 | " |

TABLE 2-continued

Results of quality performance test

| | irreversible color developer | reversible color developer | thermal recording (1) Image portions | Ground portions | Color tone | Decolorization (with heated roll) (2) Image portions | Ground portions | Contrast | Color tone | thermal recording (3) Image portions | Color tone |
|---|---|---|---|---|---|---|---|---|---|---|---|
| Example 40 | Compound B20 | Compound E19 | 1.26 | 0.04 | " | 1.01 | 0.04 | O | " | 1.26 | " |
| Example 21' | Compound B1 | Compound E6' | 1.23 | 0.04 | " | 1.01 | 0.04 | O | " | 1.23 | " |
| Example 22' | Compound B2 | Compound E11' | 1.22 | 0.04 | " | 1.01 | 0.04 | O | " | 1.22 | " |
| Example 23' | Compound B3 | Compound E12' | 1.21 | 0.04 | " | 1.03 | 0.04 | O | " | 1.21 | " |
| Example 24' | Compound B4 | Compound E13' | 1.25 | 0.04 | " | 1.03 | 0.04 | O | " | 1.25 | " |
| Example 25' | Compound B5 | Compound E14' | 1.26 | 0.04 | " | 1.02 | 0.04 | O | " | 1.26 | " |
| Example 26' | Compound B6 | Compound E15' | 1.27 | 0.04 | " | 1.02 | 0.04 | O | " | 1.27 | " |
| Example 27' | Compound B7 | Compound E16' | 1.26 | 0.04 | " | 1.03 | 0.04 | O | " | 1.26 | " |
| Example 28' | Compound B8 | Compound E17' | 1.26 | 0.04 | " | 1.03 | 0.04 | O | " | 1.26 | " |
| Example 29' | Compound B9 | Compound E18' | 1.26 | 0.04 | " | 1.01 | 0.04 | O | " | 1.26 | " |
| Example 30' | Compound B10 | Compound E19' | 1.25 | 0.04 | " | 1.01 | 0.04 | O | " | 1.25 | " |
| Example 31' | Compound B11 | Compound E6' | 1.24 | 0.04 | " | 1.02 | 0.04 | O | " | 1.24 | " |
| Example 32' | Compound B12 | Compound E11' | 1.25 | 0.04 | " | 1.03 | 0.04 | O | " | 1.25 | " |
| Example 33' | Compound B13 | Compound E12' | 1.23 | 0.04 | " | 1.03 | 0.04 | O | " | 1.23 | " |
| Example 34' | Compound B14 | Compound E13' | 1.24 | 0.04 | " | 1.03 | 0.04 | O | " | 1.24 | " |
| Example 35' | Compound B15 | Compound E14' | 1.26 | 0.04 | " | 1.01 | 0.04 | O | " | 1.26 | " |
| Example 36' | Compound B16 | Compound E15' | 1.25 | 0.04 | " | 1.02 | 0.04 | O | " | 1.25 | " |
| Example 37' | Compound B17 | Compound E16' | 1.24 | 0.04 | " | 1.00 | 0.04 | O | " | 1.24 | " |
| Example 38' | Compound B18 | Compound E17' | 1.23 | 0.04 | " | 1.02 | 0.04 | O | " | 1.23 | " |
| Example 39' | Compound B19 | Compound E18' | 1.24 | 0.04 | " | 1.03 | 0.04 | O | " | 1.24 | " |
| Example 40' | Compound B20 | Compound E19' | 1.25 | 0.04 | " | 1.01 | 0.04 | O | " | 1.25 | " |

TABLE 3

Results of quality performance test

| | conventional color developer | conventional color developer | thermal recording (1) Image portions | Ground portions | Color tone | Decolorization (with heated roll) (2) Image portions | Ground portions | Contrast | Color tone |
|---|---|---|---|---|---|---|---|---|---|
| Comparative Example 1 | BPA | BPA | 1.32 | 0.04 | reddish black | 1.30 | 1.30 | X | reddish black |
| Comparative Example 2 | BPS | BPS | 1.30 | 0.05 | " | 1.30 | 1.30 | X | " |
| Comparative Example 3 | POB | POB | 1.35 | 0.04 | " | 1.33 | 1.33 | X | " |
| Comparative Example 4 | D-8 | D-8 | 1.32 | 0.04 | " | 1.30 | 1.30 | X | " |
| Comparative Example 5 | JK1 | JK1 | 1.33 | 0.04 | " | 1.30 | 1.30 | X | " |

Note)
Conventional color developers
BPA: bisphenol A
BPS: bisphenol S
POB: p-hydroxy benzyl benzoate
D-8: 4-hydroxy-4'-isopropoxydiphenylsulfone
JK1: 4-hydroxy-4'-butoxydiphenylsulfone In Examples 1 to 20 and Examples 1' to 20', since a developed color tone changed from reddish black to red upon erasure with a heated roll, the density of image portions lowered. However, stains were not observed in ground portions. The same tendency was observed in Examples 21 to 40. However, in Comparative Examples 1 to 5, there was no change in the color tone of image portions upon erasure with a heated roll, color development occurred in all the ground portions, and additional thermal recording (3) could not be made because of the absence of color undeveloped portions.

[Examples 41 to 60] [Examples 41' to 60']

Formation of irreversible thermal recording layer Solution A (dispersion of irreversible heat-resistant color developer)

| | |
|---|---|
| irreversible heat-resistant color developer (see Tables 4 and 4') | 6.0 parts |
| 10% polyvinyl alcohol aqueous solution | 18.8 parts |
| water | 11.2 parts |

Solution I (dispersion of dye developing green color)

| | |
|---|---|
| 3-(N-p-tolyl-N-ethylamino)-7-(N-phenyl-N-methylamino)fluoran | 2.0 parts |
| 10% polyvinyl alcohol aqueous solution | 4.6 parts |
| water | 2.6 parts |

The solutions having the above compositions were ground to an average particle diameter of 1 µm with a sand grinder. Subsequently, the resulting dispersions were mixed in the proportion below to prepare a thermal recording layer coating fluid.

| solution A | 36.0 parts |
|---|---|
| solution I | 9.2 parts |
| kaolin clay (50% dispersion) | 12.0 parts |

The above coating fluid was applied to one side of a 50 g/m² substrate in a coating weight of 5.0 g/m². The coating was then dried to form an irreversible thermal recording layer.

Formation of intermediate layer

| kaolin clay (50% dispersion) | 12.0 parts |
|---|---|
| 10% polyacrylamide emulsion | 6.0 parts |
| water | 3.0 parts |

The solutions having the above compositions were mixed to prepare an intermediate layer coating fluid.

The intermediate layer coating fluid was applied to the above irreversible thermal recording layer in a coating weight of 3.0 g/m². The coating was then dried to form an intermediate layer.

Formation of reversible thermal recording layer Solution D (dispersion of reversible heat-resistance color developer)

| reversible heat-resistant color developer (see Tables 4 and 4') | 6.0 parts |
|---|---|
| 10% polyvinyl alcohol aqueous solution | 18.8 parts |
| water | 11.2 parts |

Solution E (dispersion of dye developing black color)

| 3-n-dipentylamino-6-methyl-7-anilinofluoran | 2.0 parts |
|---|---|
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare a thermal recording layer coating fluid.

| solution D | 36.0 parts |
|---|---|
| solution E | 9.2 parts |
| kaolin clay (50% dispersion) | 12.0 parts |

The above coating fluid was applied to the intermediate layer in a coating weight of 5.0 g/m². The coating was then dried to form a reversible thermal recording layer. This sheet was treated with a supercalender to achieve a smoothness of 600 to 700 seconds so as to prepare a reversible multi-color thermal recording sheet.

[Examples 61 to 80] [Examples 61' to 80']

Formation of irreversible thermal recording layer Solution A (dispersion of irreversible heat-resistant color developer)

| irreversible heat-resistant color developer (see Tables 5 and 5') | 6.0 parts |
|---|---|
| 10% polyvinyl alcohol aqueous solution | 18.8 part |
| water | 11.2 part |

Solution J (dispersion of dye developing orange color)

| 3-cyclohexylamino-6-chlorofluoran | 2.0 parts |
|---|---|
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare a thermal recording layer coating fluid.

| solution A | 36.0 parts |
|---|---|
| solution J | 9.2 parts |
| kaolin clay (50% dispersion) | 12.0 parts |

The above coating fluid was applied to one side of a 50 g/m² substrate in a coating weight of 5.0 g/m². The coating was then dried to form an irreversible thermal recording layer.

Formation of intermediate layer

| kaolin clay (50% dispersion) | 12.0 parts |
|---|---|
| 10% methyl polyacrylate emulsion | 6.0 parts |
| water | 3.0 parts |

The solutions having the above compositions were mixed to prepare an intermediate layer coating fluid.

The intermediate layer coating fluid was applied to the above irreversible thermal recording layer in a coating weight of 3.0 g/m². The coating was then dried to form an intermediate layer.

Formation of reversible thermal recording layer Solution D (dispersion of reversible heat-resistant color developer)

| reversible heat-resistant color developer (see Tables 5 and 5') | 6.0 parts |
|---|---|
| 10% polyvinyl alcohol aqueous solution | 18.8 parts |
| water | 11.2 parts |

Solution E (dispersion of dye developing black color)

| 3-n-dipentylamino-6-methyl-7-anilinofluoran | 2.0 parts |
|---|---|
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare a thermal recording layer coating fluid.

| solution D | 36.0 parts |
|---|---|
| solution E | 9.2 parts |
| kaolin clay (50% dispersion) | 12.0 parts |

The above coating fluid was applied to the intermediate layer in a coating weight of 5.0 g/m². The coating was then dried to form a reversible thermal recording layer. This sheet was treated with a supercalender to achieve a smoothness of 600 to 700 seconds so as to prepare a reversible multi-color thermal recording sheet.

[Comparative Examples 6 to 10]
Formation of thermal recording layer Solution G (dispersion of conventional color developer)

| | |
|---|---|
| conventional color developer (see Table 6) | 6.0 parts |
| 10% polyvinyl alcohol aqueous solution | 18.8 parts |
| water | 11.2 parts |

Solution I (dispersion of dye developing green color)

| | |
|---|---|
| 3-(N-p-tolyl-N-ethylamino)-7-(N-phenyl-N-methylamino)fluoran | 2.0 parts |
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare a thermal recording layer coating fluid.

| | |
|---|---|
| solution G | 36.0 parts |
| solution I | 9.2 parts |
| kaolin clay (50% dispersion) | 12.0 parts |

The above coating fluid was applied to one side of a 50 g/m² substrate in a coating weight of 5.0 g/m².

The coating was then dried to form a thermal recording layer.

Formation of intermediate layer

| | |
|---|---|
| kaolin clay (50% dispersion) | 12.0 parts |
| 10% polyacrylamide emulsion | 6.0 parts |
| water | 3.0 parts |

The solutions having the above compositions were mixed to prepare an intermediate layer coating fluid.

The intermediate layer coating fluid was applied to the above thermal recording layer in a coating weight of 3.0 g/m². The coating was then dried to form an intermediate layer.

Formation of thermal recording layer Solution G (dispersion of conventional color developer)

| | |
|---|---|
| conventional color developer (see Table 6) | 6.0 parts |
| 10% polyvinyl alcohol aqueous solution | 18.8 parts |
| water | 11.2 parts |

Solution E (dispersion of dye developing black color)

| | |
|---|---|
| 3-n-dipentylamino-6-methyl-7-anilinofluoran | 2.0 parts |
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare a thermal recording layer coating fluid.

| | |
|---|---|
| solution G | 36.0 parts |
| solution E | 9.2 parts |
| kaolin clay (50% dispersion) | 12.0 parts |

The above coating fluid was applied to the intermediate layer in a coating weight of 5.0 g/m². The coating was then dried to form a thermal recording layer. This sheet was treated with a supercalender to achieve a smoothness of 600 to 700 seconds so as to prepare a thermal recording sheet.

A quality performance test was made on the thermal recording sheets obtained in the above Examples and Comparative Examples and results are shown in Tables 4 to 6.

TABLE 4

Results of quality performance test

| | irreversible color developer | reversible color developer | thermal recording (1) | | | Decolorization (by thermal lamination) (4) | | | |
|---|---|---|---|---|---|---|---|---|---|
| | | | Image portions | Ground portions | Color tone | Image portions | Ground portions | Contrast | Color tone |
| Example 41 | Compound C4 | Compound E6 | 1.27 | 0.04 | greenish black | 1.05 | 0.04 | ○ | green |
| Example 42 | Compound C1 | Compound E20 | 1.31 | 0.04 | " | 1.04 | 0.04 | ○ | " |
| Example 43 | Compound C2 | Compound E21 | 1.32 | 0.04 | " | 1.03 | 0.04 | ○ | " |
| Example 44 | Compound C3 | Compound E22 | 1.31 | 0.04 | " | 1.05 | 0.04 | ○ | " |
| Example 45 | Compound C5 | Compound E23 | 1.29 | 0.04 | " | 1.05 | 0.04 | ○ | " |
| Example 46 | Compound C6 | Compound E24 | 1.27 | 0.04 | " | 1.05 | 0.04 | ○ | " |
| Example 47 | Compound C7 | Compound E25 | 1.28 | 0.04 | " | 1.04 | 0.04 | ○ | " |
| Example 48 | Compound C8 | Compound E26 | 1.27 | 0.04 | " | 1.04 | 0.04 | ○ | " |
| Example 49 | Compound C9 | Compound E27 | 1.30 | 0.04 | " | 1.04 | 0.04 | ○ | " |
| Example 50 | Compound C10 | Compound E28 | 1.31 | 0.04 | " | 1.03 | 0.04 | ○ | " |
| Example 51 | Compound C11 | Compound E6 | 1.29 | 0.04 | " | 1.00 | 0.04 | ○ | " |
| Example 52 | Compound C12 | Compound E20 | 1.29 | 0.04 | " | 1.06 | 0.04 | ○ | " |
| Example 53 | Compound C13 | Compound E21 | 1.31 | 0.04 | " | 1.05 | 0.04 | ○ | " |
| Example 54 | Compound C14 | Compound E22 | 1.28 | 0.04 | " | 1.00 | 0.04 | ○ | " |
| Example 55 | Compound C15 | Compound E23 | 1.30 | 0.04 | " | 1.01 | 0.04 | ○ | " |
| Example 56 | Compound C16 | Compound E24 | 1.29 | 0.04 | " | 1.02 | 0.04 | ○ | " |
| Example 57 | Compound C17 | Compound E25 | 1.31 | 0.04 | " | 1.03 | 0.04 | ○ | " |

TABLE 4-continued

Results of quality performance test

| | irreversible color developer | reversible color developer | thermal recording (1) Image portions | Ground portions | Color tone | Decolorization (by thermal lamination) (4) Image portions | Ground portions | Contrast | Color tone |
|---|---|---|---|---|---|---|---|---|---|
| Example 58 | Compound C18 | Compound E26 | 1.27 | 0.04 | " | 1.04 | 0.04 | ○ | " |
| Example 59 | Compound C19 | Compound E27 | 1.30 | 0.04 | " | 1.05 | 0.04 | ○ | " |
| Example 60 | Compound C20 | Compound E28 | 1.30 | 0.04 | " | 1.05 | 0.04 | ○ | " |
| Example 41' | Compound C4 | Compound E6' | 1.31 | 0.04 | " | 1.05 | 0.04 | ○ | " |
| Example 42' | Compound C1 | Compound E20' | 1.28 | 0.04 | " | 1.00 | 0.04 | ○ | " |
| Example 43' | Compound C2 | Compound E21' | 1.30 | 0.04 | " | 1.01 | 0.04 | ○ | " |
| Example 44' | Compound C3 | Compound E22' | 1.29 | 0.04 | " | 1.02 | 0.04 | ○ | " |
| Example 45' | Compound C5 | Compound E23' | 1.31 | 0.04 | " | 1.03 | 0.04 | ○ | " |
| Example 46' | Compound C6 | Compound E24' | 1.27 | 0.04 | " | 1.04 | 0.04 | ○ | " |
| Example 47' | Compound C7 | Compound E25' | 1.30 | 0.04 | " | 1.05 | 0.04 | ○ | " |
| Example 48' | Compound C8 | Compound E26' | 1.30 | 0.04 | " | 1.05 | 0.04 | ○ | " |
| Example 49' | Compound C9 | Compound E27' | 1.27 | 0.04 | " | 1.05 | 0.04 | ○ | " |
| Example 50' | Compound C10 | Compound E28' | 1.31 | 0.04 | " | 1.04 | 0.04 | ○ | " |
| Example 51' | Compound C11 | Compound E6' | 1.32 | 0.04 | " | 1.03 | 0.04 | ○ | " |
| Example 52' | Compound C12 | Compound E20' | 1.31 | 0.04 | " | 1.05 | 0.04 | ○ | " |
| Example 53' | Compound C13 | Compound E21' | 1.29 | 0.04 | " | 1.05 | 0.04 | ○ | " |
| Example 54' | Compound C14 | Compound E22' | 1.27 | 0.04 | " | 1.05 | 0.04 | ○ | " |
| Example 55' | Compound C15 | Compound E23' | 1.28 | 0.04 | " | 1.04 | 0.04 | ○ | " |
| Example 56' | Compound C16 | Compound E24' | 1.27 | 0.04 | " | 1.04 | 0.04 | ○ | " |
| Example 57' | Compound C17 | Compound E25' | 1.30 | 0.04 | " | 1.04 | 0.04 | ○ | " |
| Example 58' | Compound C18 | Compound E26' | 1.31 | 0.04 | " | 1.03 | 0.04 | ○ | " |
| Example 59' | Compound C19 | Compound E27' | 1.29 | 0.04 | " | 1.00 | 0.04 | ○ | " |
| Example 60' | Compound C20 | Compound E28' | 1.29 | 0.04 | " | 1.06 | 0.04 | ○ | " |

TABLE 5

Results of quality performance test

| | irreversible color developer | reversible color developer | thermal recording (1) Image portions | Ground portions | Color tone | Decolorization (by thermal lamination) (4) Image portions | Ground portions | Contrast | Color tone |
|---|---|---|---|---|---|---|---|---|---|
| Example 61 | Compound D1 | Compound E6 | 1.32 | 0.04 | black with an orange tint | 0.42 | 0.04 | ○ | orange |
| Example 62 | Compound D2 | Compound E29 | 1.30 | 0.04 | " | 0.46 | 0.04 | ○ | " |
| Example 63 | Compound D3 | Compound E30 | 1.30 | 0.04 | " | 0.45 | 0.04 | ○ | " |
| Example 64 | Compound D4 | Compound E31 | 1.30 | 0.04 | " | 0.47 | 0.04 | ○ | " |
| Example 65 | Compound D5 | Compound E32 | 1.32 | 0.04 | " | 0.46 | 0.04 | ○ | " |
| Example 66 | Compound D6 | Compound E33 | 1.32 | 0.04 | " | 0.42 | 0.04 | ○ | " |
| Example 67 | Compound D7 | Compound E34 | 1.31 | 0.04 | " | 0.43 | 0.04 | ○ | " |
| Example 68 | Compound D8 | Compound E35 | 1.32 | 0.04 | " | 0.45 | 0.04 | ○ | " |
| Example 69 | Compound D9 | Compound E36 | 1.30 | 0.04 | " | 0.46 | 0.04 | ○ | " |
| Example 70 | Compound D10 | Compound E37 | 1.31 | 0.04 | " | 0.45 | 0.04 | ○ | " |
| Example 71 | Compound D11 | Compound E6 | 1.32 | 0.04 | " | 0.43 | 0.04 | ○ | " |
| Example 72 | Compound D12 | Compound E29 | 1.30 | 0.04 | " | 0.42 | 0.04 | ○ | " |
| Example 73 | Compound D13 | Compound E30 | 1.28 | 0.04 | " | 0.43 | 0.04 | ○ | " |
| Example 74 | Compound D14 | Compound E31 | 1.27 | 0.04 | " | 0.42 | 0.04 | ○ | " |
| Example 75 | Compound D15 | Compound E32 | 1.30 | 0.04 | " | 0.43 | 0.04 | ○ | " |
| Example 76 | Compound D16 | Compound E33 | 1.27 | 0.04 | " | 0.44 | 0.04 | ○ | " |
| Example 77 | Compound D17 | Compound E34 | 1.28 | 0.04 | " | 0.45 | 0.04 | ○ | " |
| Example 78 | Compound D18 | Compound E35 | 1.32 | 0.04 | " | 0.46 | 0.04 | ○ | " |
| Example 79 | Compound D19 | Compound E36 | 1.32 | 0.04 | " | 0.47 | 0.04 | ○ | " |
| Example 80 | Compound D20 | Compound E37 | 1.30 | 0.04 | " | 0.43 | 0.04 | ○ | " |
| Example 61' | Compound D1 | Compound E6' | 1.30 | 0.04 | " | 0.42 | 0.04 | ○ | " |
| Example 62' | Compound D2 | Compound E29' | 1.28 | 0.04 | " | 0.43 | 0.04 | ○ | " |
| Example 63' | Compound D3 | Compound E30' | 1.27 | 0.04 | " | 0.42 | 0.04 | ○ | " |
| Example 64' | Compound D4 | Compound E31' | 1.30 | 0.04 | " | 0.43 | 0.04 | ○ | " |
| Example 65' | Compound D5 | Compound E32' | 1.27 | 0.04 | " | 0.44 | 0.04 | ○ | " |
| Example 66' | Compound D6 | Compound E33' | 1.28 | 0.04 | " | 0.45 | 0.04 | ○ | " |
| Example 67' | Compound D7 | Compound E34' | 1.32 | 0.04 | " | 0.46 | 0.04 | ○ | " |
| Example 68' | Compound D8 | Compound E35' | 1.32 | 0.04 | " | 0.47 | 0.04 | ○ | " |
| Example 69' | Compound D9 | Compound E36' | 1.30 | 0.04 | " | 0.43 | 0.04 | ○ | " |
| Example 70' | Compound D10 | Compound E37' | 1.32 | 0.04 | " | 0.42 | 0.04 | ○ | " |
| Example 71' | Compound D11 | Compound E6' | 1.30 | 0.04 | " | 0.46 | 0.04 | ○ | " |
| Example 72' | Compound D12 | Compound E29' | 1.30 | 0.04 | " | 0.45 | 0.04 | ○ | " |
| Example 73' | Compound D13 | Compound E30' | 1.30 | 0.04 | " | 0.47 | 0.04 | ○ | " |
| Example 74' | Compound D14 | Compound E31' | 1.32 | 0.04 | " | 0.46 | 0.04 | ○ | " |

TABLE 5-continued

Results of quality performance test

| | irreversible color developer | reversible color developer | thermal recording (1) | | | Decolorization (by thermal lamination) (4) | | | |
|---|---|---|---|---|---|---|---|---|---|
| | | | Image portions | Ground portions | Color tone | Image portions | Ground portions | Contrast | Color tone |
| Example 75' | Compound D15 | Compound E32' | 1.32 | 0.04 | " | 0.42 | 0.04 | ◯ | " |
| Example 76' | Compound D16 | Compound E33' | 1.31 | 0.04 | " | 0.43 | 0.04 | ◯ | " |
| Example 77' | Compound D17 | Compound E34' | 1.32 | 0.04 | " | 0.45 | 0.04 | ◯ | " |
| Example 78' | Compound D18 | Compound E35' | 1.30 | 0.04 | " | 0.46 | 0.04 | ◯ | " |
| Example 79' | Compound D19 | Compound E36' | 1.31 | 0.04 | " | 0.45 | 0.04 | ◯ | " |
| Example 80' | Compound D20 | Compound E37' | 1.32 | 0.04 | " | 0.43 | 0.04 | ◯ | " |

TABLE 6

Results of quality performance test

| | conventional color developer | conventional color developer | thermal recording (1) | | | Decolorization (by thermal lamination) (4) | | | |
|---|---|---|---|---|---|---|---|---|---|
| | | | Image portions | Ground portions | Color tone | Image portions | Ground portions | Contrast | Color tone |
| Comparative Example 6 | BPA | BPA | 1.33 | 0.04 | greenish black | 1.32 | 1.30 | X | greenish black |
| Comparative Example 7 | BPS | BPS | 1.30 | 0.05 | " | 1.30 | 1.30 | X | " |
| Comparative Example 8 | POB | POB | 1.32 | 0.04 | " | 1.30 | 1.33 | X | " |
| Comparative Example 9 | D-8 | D-8 | 1.31 | 0.04 | " | 1.29 | 1.30 | X | " |
| Comparative Example 10 | JK1 | JK1 | 1.29 | 0.04 | " | 1.28 | 1.30 | X | " |

Note (4) decolorization (by thermal lamination): A simplified lamination apparatus (MS Pouch H-140 manufactured by Meiko Shokai K.K.) and a laminate film (MS Pouch Film MP10-6095) were used. A laminated thermal recording medium having a thermal recording portion was fabricated by sandwiching a reversible multi-color thermal recording medium on which dynamic recording was made by the method of Note (1) between the above laminate films at a feed rate of 20 mm/sec. After thermal lamination, image and ground portions which were subjected to the above thermal recording were measured by a Macbeth densitometer through the laminate film of the laminated thermal recording medium (high value because of measurement through the laminate film). As for ground portions, the smaller the Macbeth density value the more stable the color of the ground becomes. Contrast between image portions and ground portions of the laminated thermal recording portion was evaluated as follows. Laminated thermal recording media whose contrasts are rated Δ to X are difficult to read. In fact, thermal lamination was impossible.

◯ ... no or almost no color development of the ground portions (thermal lamination impossible)

Δ ... color development of the ground portions

X ... marked color development of the ground portions

In Examples 41 to 80 and Examples 41' to 80', thermal lamination was effected without failure and a change in the color tone of image portions caused by thermal lamination was good. However, in Comparative Examples 6 to 10, there was no change in the color tone of image portions caused by thermal lamination and color development occurred in all the ground portions.

<production of reversible multi-color optical recording medium, Examples 81 to 120, Examples 81' to 120' and Comparative Examples 11 to 20>

[Examples 81 to 100] [Examples 81' to 100']

Formation of irreversible optical recording layer Solution A (dispersion of irreversible heat-resistant color developer)

| irreversible heat-resistant color developer (see Tables 7 and 7') | 6.0 parts |
|---|---|
| 10% polyvinyl alcohol aqueous solution | 18.8 parts |
| water | 11.2 parts |

Solution B (dispersion of dye developing red color)

| 3,3-bis(1-ethyl-2-methylindole-3-yl)phthalide | 2.0 parts |
|---|---|
| 10% polyvinyl alcohol aqueous solution | 4.6 parts |
| water | 2.6 parts |

Solution K (aqueous solution of light absorbent)

| NK-2612 (manufactured by Nippon Kanko Shikiso Kenkyujo) | 0.04 part |
|---|---|
| water | 4.0 parts |

The solutions having the above compositions were ground to an average particle diameter of 1 μm with a sand grinder. Subsequently, the resulting dispersions were mixed in the proportion below to prepare an optical recording layer coating fluid.

| solution A | 36.0 parts |
| --- | --- |
| solution B | 9.2 parts |
| solution K | 4.04 parts |
| kaolin clay (50% dispersion) | 12.0 parts |

The above coating fluid was applied to one side of a 50 g/m² substrate in a coating weight of 5.0 g/m². The coating was then dried to form an irreversible optical recording layer.

Formation of intermediate layer

| kaolin clay (50% dispersion) | 12.0 parts |
| --- | --- |
| 10% polyvinyl alcohol aqueous solution | 6.0 parts |
| water | 3.0 parts |

The solutions having the above compositions were mixed to prepare an intermediate layer coating fluid.

The intermediate layer coating fluid was applied to the above irreversible optical recording layer in a coating weight of 3.0 g/m². The coating was then dried to form an intermediate layer.

Formation of reversible optical recording layer Solution D (dispersion of reversible heat-resistance color developer)

| reversible heat-resistant color developer (see Tables 7 and 7') | 6.0 parts |
| --- | --- |
| 10% polyvinyl alcohol aqueous solution | 18.8 parts |
| water | 11.2 parts |

Solution E (dispersion of dye developing black color)

| 3-n-dipentylamino-6-methyl-7-anilinofluoran | 2.0 parts |
| --- | --- |
| 10% polyvinyl alcohol aqueous solution | 4.6 parts |
| water | 2.6 parts |

Solution K (aqueous solution of light absorbent)

| NK-2612 (manufactured by Nippon Kanko Shikiso Kenkyujo) | 0.04 part |
| --- | --- |
| water | 4.0 parts |

The solutions having the above compositions were ground to an average particle diameter of 1 μm with a sand grinder. Subsequently, the resulting dispersions were mixed in the proportion below to prepare an optical recording layer coating fluid.

| solution D | 36.0 parts |
| --- | --- |
| solution E | 9.2 parts |
| solution K | 4.04 parts |
| kaolin clay (50% dispersion) | 12.0 parts |

The above coating fluid was applied to the intermediate layer in a coating weight of 5.0 g/m². The coating was then dried to form a reversible optical recording layer. This sheet was treated with a supercalender to achieve a smoothness of 600 to 700 seconds so as to prepare a reversible optical recording sheet.

[Comparative Examples 11 to 15]

Formation of optical recording layer Solution G (dispersion of conventional color developer)

| conventional color developer (see Table 8) | 6.0 parts |
| --- | --- |
| 10% polyvinyl alcohol aqueous solution | 18.8 parts |
| water | 11.2 parts |

Solution B (dispersion of dye developing red color)

| 3,3-bis(1-ethyl-2-methyl-indole-3-yl) phthalide | 2.0 parts |
| --- | --- |
| 10% polyvinyl alcohol aqueous solution | 4.6 parts |
| water | 2.6 parts |

Solution K (aqueous solution of light absorbent)

| NK-2612 ((manufactured by Nippon Kanko Shikiso Kenkyujo) | 0.04 part |
| --- | --- |
| water | 4.0 parts |

The solutions having the above compositions were ground to an average particle diameter of 1 μm with a sand grinder. Subsequently, the resulting dispersions were mixed in the proportion below to prepare an optical recording layer coating fluid.

| solution G | 36.0 parts |
| --- | --- |
| solution B | 9.2 parts |
| solution K | 4.04 parts |
| kaolin clay (50% dispersion) | 12.0 parts |

The above coating fluid was applied to one side of a 50 g/m² substrate in a coating weight of 5.0 g/m². The coating was then dried to form an optical recording layer.

Formation of intermediate layer

| kaolin clay (50% dispersion) | 12.0 parts |
| --- | --- |
| 10% polyvinyl alcohol aqueous solution | 6.0 parts |
| water | 3.0 parts |

The solutions having the above compositions were mixed to prepare an intermediate layer coating fluid.

The intermediate layer coating fluid was applied to the above optical recording layer in a coating weight of 3.0 g/m². The coating was then dried to form an intermediate layer.

Formation of optical recording layer Solution G (dispersion of conventional color developer)

| conventional color developer (see Table 8) | 6.0 parts |
| --- | --- |
| 10% polyvinyl alcohol aqueous solution | 18.8 parts |
| water | 11.2 parts |

Solution E (dispersion of dye developing black color)

| 3-n-dipentylamino-6-methyl-7-anilinofluoran | 2.0 parts |
| --- | --- |
| 10% polyvinyl alcohol aqueous solution | 4.6 parts |
| water | 2.6 parts |

Solution K (aqueous solution of light absorbent)

| | |
|---|---|
| NK-2612 ((manufactured by Nippon Kanko Shikiso Kenkyujo) | 0.04 part |
| water | 4.0 parts |

The solutions having the above compositions were ground to an average particle diameter of 1 μm with a sand grinder. Subsequently, the resulting dispersions were mixed in the proportion below to prepare an optical recording layer coating fluid.

| | |
|---|---|
| solution G | 36.0 parts |
| solution E | 9.2 parts |
| solution K | 4.04 parts |
| kaolin clay (50% dispersion) | 12.0 parts |

The above coating fluid was applied to the intermediate layer in a coating weight of 5.0 g/m². The coating was then dried to form an optical recording layer. This sheet was treated with a supercalender to achieve a smoothness of 600 to 700 seconds so as to prepare an optical recording sheet.
[Examples 101 to 120] [Examples 101' to 120']
Formation of irreversible optical recording layer Solution L (simultaneous dispersion of irreversible heat-resistant color developer and light absorbent)

| | |
|---|---|
| irreversible heat-resistant color developer (see Tables 9 and 9') | 6.0 parts |
| bis(1-tert-butyl-3,4-dithiophenolate)nickeltetra-n-butylammonium (light absorbent) | 0.3 part |
| 10% polyvinyl alcohol aqueous solution | 18.8 parts |
| water | 11.2 parts |

Solution F (dispersion of dye developing blue color)

| | |
|---|---|
| 3,3-bis(p-dimethylaminophenyl)-6-dimethylaminophthalide | 2.0 parts |
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare an optical recording layer coating fluid.

| | |
|---|---|
| solution L | 36.3 parts |
| solution F | 9.2 parts |
| kaolin clay (50% dispersion) | 12.0 parts |

The above coating fluid was applied to one side of a 50 g/m² substrate in a coating weight of 5.0 g/m². The coating was then dried to form an irreversible optical recording layer.
Formation of intermediate layer

| | |
|---|---|
| kaolin clay (50% dispersion) | 12.0 parts |
| 10% polyacrylamide emulsion | 6.0 parts |
| water | 3.0 parts |

The solutions having the above compositions were mixed to prepare an intermediate layer coating fluid.
The intermediate coating fluid was applied to the above irreversible optical recording layer in a coating weight of 3.0 g/m². The coating was then dried to form an intermediate layer.

Formation of reversible optical recording layer Solution M (simultaneous dispersion of reversible heat-resistant color developer and light absorbent)

| | |
|---|---|
| reversible heat-resistant color developer (see Table 9) | 6.0 parts |
| bis(1-tert-butyl-3,4-dithiophenolate)nickeltetra-n-butylammonium (light absorbent) | 0.3 part |
| 10% polyvinyl alcohol aqueous solution | 18.8 parts |
| water | 11.2 parts |

Solution E (dispersion of dye developing black color)

| | |
|---|---|
| 3-n-dipentylamino-6-methyl-7-anilinofluoran | 2.0 parts |
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare a thermal recording layer coating fluid.

| | |
|---|---|
| solution M | 36.3 parts |
| solution E | 9.2 parts |
| kaolin clay (50% dispersion) | 12.0 parts |

The above coating fluid was applied to the intermediate layer in a coating weight of 3.0 g/m². The coating was then dried to form a reversible optical recording layer. This sheet was treated with a supercalender to achieve a smoothness of 600 to 700 seconds to prepare a reversible multi-color optical recording sheet.
[Comparative Examples 16 to 20]
Formation of optical recording layer Solution N (simultaneous dispersion of conventional color developer and light absorbent)

| | |
|---|---|
| conventional color developer (see Table 10) | 6.0 parts |
| bis(1-tert-butyl-3,4-dithiophenolate)nickeltetra-n-butylammonium (light absorbent) | 0.3 part |
| 10% polyvinyl alcohol aqueous solution | 18.8 parts |
| water | 11.2 parts |

Solution F (dispersion of dye developing blue color)

| | |
|---|---|
| 3-3-bis(p-dimethylaminophenyl)-6-dimethylaminophthalide | 2.0 parts |
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare an optical recording layer coating fluid.

| | |
|---|---|
| solution N | 36.3 parts |
| solution F | 9.2 parts |
| kaolin clay (50% dispersion) | 12.0 parts |

The above coating fluid was applied to one side of a 50 g/m² substrate in a coating weight of 5.0 g/m². The coating was then dried to form an optical recording layer.

Formation of intermediate layer

| | |
|---|---|
| kaolin clay (50% dispersion) | 12.0 parts |
| 10% polyacrylamide emulsion | 6.0 parts |
| water | 3.0 parts |

The solutions having the above compositions were mixed to prepare an intermediate layer coating fluid.

The intermediate layer coating fluid was applied to the above optical recording layer in a coating weight of 3.0 g/m². The coating was then dried to form an intermediate layer.

Formation of optical recording layer Solution O (simultaneous dispersion of conventional color developer and light absorbent)

| | |
|---|---|
| conventional color developer (see Table 10) | 6.0 parts |
| bis(1-tert-butyl-3,4-dithiophenolate)nickeltetra-n-butylammonium (light absorbent) | 0.3 part |
| 10% polyvinyl alcohol aqueous solution | 18.8 parts |
| water | 11.2 parts |

Solution E (dispersion of dye developing black color)

| | |
|---|---|
| 3-dipentylamino-6-methyl-7-anilinofluoran | 2.0 parts |
| 10% polyvinyl alcohol aqueous solution | 4.6 parts |
| water | 2.6 parts |

The solutions having the above compositions were ground to an average particle diameter of 1 μm with a sand grinder. Subsequently, the resulting dispersions were mixed in the proportion below to prepare an optical recording layer coating fluid.

| | |
|---|---|
| solution O | 36.3 parts |
| solution E | 9.2 parts |
| kaolin clay (50% dispersion) | 12.0 parts |

The above coating fluid was applied to the intermediate layer in a coating weight of 5.0 g/m². The coating was then dried to form an optical recording layer. This sheet was treated with a supercalender to achieve a smoothness of 600 to 700 seconds to prepare an optical recording sheet.

A quality performance test was made on the optical recording sheets obtained in the above Examples and Comparative Examples and results are shown in Tables 7 to 10.

TABLE 7

Results of quality performance test

| | irreversible color developer | reversible color developer | Optical recording (5) Image portions | Optical recording (5) Ground portions | Optical recording (5) Color tone | Decolorization (by thermal lamination) (6) Image portions | Decolorization (by thermal lamination) (6) Ground portions | Decolorization (by thermal lamination) (6) Color tone | additional optical recording (7) Image portions | additional optical recording (7) Color tone |
|---|---|---|---|---|---|---|---|---|---|---|
| Example 81 | Compound A1 | Compound E6 | 1.12 | 0.30 | reddish black | 1.40 | 0.30 | red | 1.15 | reddish black |
| Example 82 | Compound A25 | Compound E1 | 1.09 | 0.30 | " | 1.41 | 0.30 | " | 1.12 | " |
| Example 83 | Compound A2 | Compound E2 | 1.17 | 0.31 | " | 1.42 | 0.31 | " | 1.20 | " |
| Example 84 | Compound A3 | Compound E3 | 1.20 | 0.30 | " | 1.41 | 0.30 | " | 1.23 | " |
| Example 85 | Compound A4 | Compound E4 | 1.23 | 0.31 | " | 1.39 | 0.31 | " | 1.25 | " |
| Example 86 | Compound B1 | Compound E5 | 1.11 | 0.31 | " | 1.38 | 0.32 | " | 1.15 | " |
| Example 87 | Compound B2 | Compound E7 | 1.10 | 0.31 | " | 1.42 | 0.32 | " | 1.12 | " |
| Example 88 | Compound B3 | Compound E8 | 1.15 | 0.30 | " | 1.43 | 0.31 | " | 1.18 | " |
| Example 89 | Compound B4 | Compound E9 | 1.17 | 0.29 | " | 1.38 | 0.30 | " | 1.20 | " |
| Example 90 | Compound B5 | Compound E10 | 1.15 | 0.29 | " | 1.39 | 0.30 | " | 1.18 | " |
| Example 91 | Compound C1 | Compound E1 | 1.22 | 0.30 | " | 1.38 | 0.31 | " | 1.25 | " |
| Example 92 | Compound C2 | Compound E2 | 1.21 | 0.31 | " | 1.38 | 0.32 | " | 1.25 | " |
| Example 93 | Compound C3 | Compound E3 | 1.15 | 0.31 | " | 1.42 | 0.32 | " | 1.20 | " |
| Example 94 | Compound C4 | Compound E4 | 1.16 | 0.30 | " | 1.41 | 0.31 | " | 1.20 | " |
| Example 95 | Compound C5 | Compound E5 | 1.18 | 0.31 | " | 1.40 | 0.32 | " | 1.23 | " |
| Example 96 | Compound D1 | Compound E6 | 1.20 | 0.30 | " | 1.39 | 0.31 | " | 1.25 | " |
| Example 97 | Compound D2 | Compound E7 | 1.23 | 0.29 | " | 1.41 | 0.30 | " | 1.25 | " |
| Example 98 | Compound D3 | Compound E8 | 1.20 | 0.29 | " | 1.42 | 0.30 | " | 1.24 | " |
| Example 99 | Compound D4 | Compound E9 | 1.19 | 0.31 | " | 1.40 | 0.32 | " | 1.23 | " |
| Example 100 | Compound D5 | Compound E10 | 1.17 | 0.30 | " | 1.40 | 0.31 | " | 1.22 | " |
| Example 81' | Compound A1 | Compound E6' | 1.16 | 0.30 | " | 1.41 | 0.31 | " | 1.20 | " |
| Example 82' | Compound A25 | Compound E1' | 1.18 | 0.31 | " | 1.40 | 0.32 | " | 1.23 | " |
| Example 83' | Compound A2 | Compound E2' | 1.20 | 0.30 | " | 1.39 | 0.31 | " | 1.25 | " |
| Example 84' | Compound A3 | Compound E3' | 1.23 | 0.29 | " | 1.41 | 0.30 | " | 1.25 | " |
| Example 85' | Compound A4 | Compound E4' | 1.20 | 0.29 | " | 1.42 | 0.30 | " | 1.24 | " |
| Example 86' | Compound B1 | Compound E5' | 1.19 | 0.31 | " | 1.40 | 0.32 | " | 1.23 | " |
| Example 87' | Compound B2 | Compound E7' | 1.17 | 0.30 | " | 1.40 | 0.31 | " | 1.22 | " |
| Example 88' | Compound B3 | Compound E8' | 1.12 | 0.30 | " | 1.40 | 0.30 | " | 1.15 | " |
| Example 89' | Compound B4 | Compound E9' | 1.09 | 0.30 | " | 1.41 | 0.30 | " | 1.12 | " |
| Example 90' | Compound B5 | Compound E10' | 1.17 | 0.31 | " | 1.42 | 0.31 | " | 1.20 | " |
| Example 91' | Compound C1 | Compound E1' | 1.20 | 0.30 | " | 1.41 | 0.30 | " | 1.23 | " |
| Example 92' | Compound C2 | Compound E2' | 1.23 | 0.31 | " | 1.39 | 0.31 | " | 1.25 | " |
| Example 93' | Compound C3 | Compound E3' | 1.11 | 0.31 | " | 1.38 | 0.32 | " | 1.15 | " |
| Example 94' | Compound C4 | Compound E4' | 1.10 | 0.31 | " | 1.42 | 0.32 | " | 1.12 | " |
| Example 95' | Compound C5 | Compound E5' | 1.15 | 0.30 | " | 1.43 | 0.31 | " | 1.18 | " |

TABLE 7-continued

Results of quality performance test

| | irreversible color developer | reversible color developer | Optical recording (5) | | | Decolorization (by thermal lamination) (6) | | | additional optical recording (7) | |
|---|---|---|---|---|---|---|---|---|---|---|
| | | | Image portions | Ground portions | Color tone | Image portions | Ground portions | Color tone | Image portions | Color tone |
| Example 96' | Compound D1 | Compound E6' | 1.17 | 0.29 | " | 1.38 | 0.30 | " | 1.20 | " |
| Example 97' | Compound D2 | Compound E7' | 1.15 | 0.29 | " | 1.39 | 0.30 | " | 1.18 | " |
| Example 98' | Compound D3 | Compound E8' | 1.22 | 0.30 | " | 1.38 | 0.31 | " | 1.25 | " |
| Example 99' | Compound D4 | Compound E9' | 1.21 | 0.31 | " | 1.38 | 0.32 | " | 1.25 | " |
| Example 100' | Compound D5 | Compound E10' | 1.15 | 0.31 | " | 1.42 | 0.32 | " | 1.20 | " |

TABLE 8

Results of quality performance test

| | conventional color developer | conventional color developer | Optical recording (5) | | | Decolorization (by thermal lamination) (6) | | | additional optical recording (7) | |
|---|---|---|---|---|---|---|---|---|---|---|
| | | | Image portions | Ground portions | Color tone | Image portions | Ground portions | Color tone | Image portions | Color tone |
| Comparative Example 11 | BPA | BPA | 1.15 | 0.30 | reddish black | 1.15 | 1.15 | reddish black | — | — |
| Comparative Example 12 | BPS | BPS | 1.14 | 0.30 | " | 1.14 | 1.14 | " | — | — |
| Comparative Example 13 | POB | POB | 1.16 | 0.31 | " | 1.16 | 1.16 | " | — | — |
| Comparative Example 14 | D-8 | D-8 | 1.14 | 0.31 | " | 1.14 | 1.14 | " | — | — |
| Comparative Example 15 | JK1 | JK1 | 1.14 | 0.31 | " | 1.14 | 1.14 | " | — | — |

Note)
Conventional color developers
BPA: bisphenol A
BPS: bisphenol S
POB: p-hydroxy benzyl benzoate
D-8: 4-hydroxy-4-isopropoxydiphenylsulfone
JK1: 4-hydroxy-4'-butoxydiphenylsulfone

TABLE 9

Results of quality performance test

| | irreversible color developer | reversible color developer | Optical recording (5) | | | Decolorization (by thermal lamination) (6) | | | additional optical recording (7) | |
|---|---|---|---|---|---|---|---|---|---|---|
| | | | Image portions | Ground portions | Color tone | Image portions | Ground portions | Color tone | Image portions | Color tone |
| Example 101 | Compound A5 | Compound E6 | 1.22 | 0.20 | bluish black | 1.10 | 0.20 | blue | 1.25 | bluish black |
| Example 102 | Compound A6 | Compound E1 | 1.21 | 0.20 | " | 1.10 | 0.20 | " | 1.24 | " |
| Example 103 | Compound A7 | Compound E2 | 1.22 | 0.21 | " | 1.12 | 0.21 | " | 1.29 | " |
| Example 104 | Compound A8 | Compound E3 | 1.24 | 0.20 | " | 1.11 | 0.20 | " | 1.27 | " |
| Example 105 | Compound A9 | Compound E4 | 1.25 | 0.21 | " | 1.13 | 0.21 | " | 1.30 | " |
| Example 106 | Compound B6 | Compound E5 | 1.20 | 0.21 | " | 1.12 | 0.21 | " | 1.28 | " |
| Example 107 | Compound B7 | Compound E7 | 1.23 | 0.21 | " | 1.14 | 0.21 | " | 1.28 | " |
| Example 108 | Compound B8 | Compound E8 | 1.20 | 0.20 | " | 1.13 | 0.20 | " | 1.25 | " |
| Example 109 | Compound B9 | Compound E9 | 1.22 | 0.22 | " | 1.15 | 0.22 | " | 1.27 | " |
| Example 110 | Compound B10 | Compound E10 | 1.23 | 0.29 | " | 1.10 | 0.29 | " | 1.26 | " |
| Example 111 | Compound C6 | Compound E1 | 1.21 | 0.20 | " | 1.11 | 0.20 | " | 1.25 | " |
| Example 112 | Compound C7 | Compound E2 | 1.23 | 0.21 | " | 1.13 | 0.21 | " | 1.28 | " |
| Example 113 | Compound C8 | Compound E3 | 1.24 | 0.21 | " | 1.12 | 0.21 | " | 1.27 | " |
| Example 114 | Compound C9 | Compound E4 | 1.23 | 0.20 | " | 1.11 | 0.20 | " | 1.25 | " |
| Example 115 | Compound C10 | Compound E5 | 1.22 | 0.21 | " | 1.13 | 0.21 | " | 1.27 | " |
| Example 116 | Compound D6 | Compound E6 | 1.24 | 0.20 | " | 1.14 | 0.20 | " | 1.28 | " |
| Example 117 | Compound D7 | Compound E7 | 1.23 | 0.22 | " | 1.15 | 0.22 | " | 1.31 | " |
| Example 118 | Compound D8 | Compound E8 | 1.24 | 0.21 | " | 1.12 | 0.21 | " | 1.30 | " |
| Example 119 | Compound D9 | Compound E9 | 1.25 | 0.21 | " | 1.13 | 0.21 | " | 1.29 | " |
| Example 120 | Compound D10 | Compound E10 | 1.24 | 0.20 | " | 1.12 | 0.20 | " | 1.28 | " |
| Example 101' | Compound A5 | Compound E6' | 1.24 | 0.21 | " | 1.12 | 0.21 | " | 1.27 | " |
| Example 102' | Compound A6 | Compound E1' | 1.23 | 0.20 | " | 1.11 | 0.20 | " | 1.25 | " |

TABLE 9-continued

Results of quality performance test

| | irreversible color developer | reversible color developer | Optical recording (5) | | | Decolorization (by thermal lamination) (6) | | | additional optical recording (7) | |
|---|---|---|---|---|---|---|---|---|---|---|
| | | | Image portions | Ground portions | Color tone | Image portions | Ground portions | Color tone | Image portions | Color tone |
| Example 103' | Compound A7 | Compound E2' | 1.22 | 0.21 | " | 1.13 | 0.21 | " | 1.27 | " |
| Example 104' | Compound A8 | Compound E3' | 1.24 | 0.20 | " | 1.14 | 0.20 | " | 1.28 | " |
| Example 105' | Compound A9 | Compound E4' | 1.23 | 0.22 | " | 1.15 | 0.22 | " | 1.31 | " |
| Example 106' | Compound B6 | Compound E5' | 1.24 | 0.21 | " | 1.12 | 0.21 | " | 1.30 | " |
| Example 107' | Compound B7 | Compound E7' | 1.25 | 0.21 | " | 1.13 | 0.21 | " | 1.29 | " |
| Example 108' | Compound B8 | Compound E8' | 1.24 | 0.20 | " | 1.12 | 0.20 | " | 1.28 | " |
| Example 109' | Compound B9 | Compound E9' | 1.22 | 0.20 | " | 1.10 | 0.20 | " | 1.25 | " |
| Example 110' | Compound B10 | Compound E10' | 1.21 | 0.20 | " | 1.10 | 0.20 | " | 1.24 | " |
| Example 111' | Compound C6 | Compound E1' | 1.22 | 0.21 | " | 1.12 | 0.21 | " | 1.29 | " |
| Example 112' | Compound C7 | Compound E2' | 1.24 | 0.20 | " | 1.11 | 0.20 | " | 1.27 | " |
| Example 113' | Compound C8 | Compound E3' | 1.25 | 0.21 | " | 1.13 | 0.21 | " | 1.30 | " |
| Example 114' | Compound C9 | Compound E4' | 1.20 | 0.21 | " | 1.12 | 0.21 | " | 1.28 | " |
| Example 115' | Compound C10 | Compound E5' | 1.23 | 0.21 | " | 1.14 | 0.21 | " | 1.28 | " |
| Example 116' | Compound D6 | Compound E6' | 1.20 | 0.20 | " | 1.13 | 0.20 | " | 1.25 | " |
| Example 117' | Compound D7 | Compound E7' | 1.22 | 0.22 | " | 1.15 | 0.22 | " | 1.27 | " |
| Example 118' | Compound D8 | Compound E8' | 1.23 | 0.29 | " | 1.10 | 0.29 | " | 1.26 | " |
| Example 119' | Compound D9 | Compound E9' | 1.21 | 0.20 | " | 1.11 | 0.20 | " | 1.25 | " |
| Example 120' | Compound D10 | Compound E10' | 1.23 | 0.21 | " | 1.13 | 0.21 | " | 1.28 | " |

TABLE 10

Results of quality performance test

| | conventional color developer | conventional color developer | Optical recording (5) | | | Decolorization (by thermal lamination) (6) | | | additional optical recording (7) | |
|---|---|---|---|---|---|---|---|---|---|---|
| | | | Image portions | Ground portions | Color tone | Image portions | Ground portions | Color tone | Image portions | Color tone |
| Comparative Example 16 | BPA | BPA | 1.23 | 0.20 | bluish black | 1.23 | 1.23 | bluish black | — | — |
| Comparative Example 17 | BPS | BPS | 1.20 | 0.21 | " | 1.20 | 1.20 | " | — | — |
| Comparative Example 18 | POB | POB | 1.24 | 0.20 | " | 1.24 | 1.24 | " | — | — |
| Comparative Example 19 | D-8 | D-8 | 1.22 | 0.20 | " | 1.22 | 1.22 | " | — | — |
| Comparative Example 20 | JK1 | JK1 | 1.23 | 0.21 | " | 1.23 | 1.23 | " | — | — |

Note (5) optical recording: Using a laser plotter disclosed in Japanese Patent Publication No. 3-239598, laser recording was carried out by the following method. The LTO15MD semiconductor laser (manufactured by Sharp) having an oscillation wavelength of 830 nm and an output of 30 mW was used as a light source for optical recording, and two of the AP4545 non-spherical plastic lens (manufactured by Konica) having an aperture of 0.45 and a focusing distance of 4.5 mm were used as condenser lenses. A laser recording head comprising the above semiconductor laser and lenses was caused to scan at a recording speed of 50 mm/sec and at recording line intervals of 50 µm to obtain a 1 cm2 solid-colored image. This 1 cm$^2$ solid-colored image was measured for its density with a Macbeth densitometer (RD-914 using an amber filter). This value was taken as the optical recording density of image portions. The reason why the values of ground portions are slightly bad in Examples 81 to 120 is that the optical recording media are slightly colored because of the colored light absorbent. In Comparative Examples 11 to 20, decolorization was not caused by thermal lamination and, conversely, marked color development occurred in the ground portions. As the result, additional recording could not be carried out.

Note (6) decolorization (by thermal lamination): A simplified lamination apparatus (MS Pouch H-140 manufactured by Meiko Shokai K.K.) and a laminate film (MS Pouch Film MP10-6095) were used. A laminated optical recording medium having a thermal recording portion was fabricated by sandwiching a reversible multi-color optical recording medium on which optical recording was made by the method of Note (4) between the above laminate films at a feed rate of 20 mm/sec. After thermal lamination, image and ground portions which were subjected to the above optical recording were measured by a Macbeth densitometer through the laminate film of the laminated optical recording medium (high value because of measurement through the laminate film). As for ground portions, the smaller the Macbeth density value the more stable the color of the ground becomes. Contrast between image portions and ground portions of the laminated thermal recording portion was evaluated as follows. Laminated optical recording media whose contrasts are rated Δ to X are difficult to read. In fact, thermal lamination was impossible.

○ . . . no or almost no color development of the ground portions (thermal lamination possible)

Δ . . . color development of the ground portions

X ... marked color development of the ground portions

Note (7) additional recording: Optical recording was made on optical recording media after thermal lamination by the following method, using flash light from a strobe. Optical recording was effected by stopping down the window of the auto 4330 strobe flash for cameras (manufactured by Sunpack Co.) to 5% and irradiating light. The color developed images were measured for their densities by a Macbeth densitometer (RD-914 using an amber filter). The density values were taken as optical recording densities of the image portions.

In Examples 81 to 120, thermal lamination was carried out after optical recording without failure, a change in the color tone of the image portions caused by thermal lamination was good, and there were no stains in the ground portions. However, in Comparative Examples 11 to 20, there was no change in the color tone of the image portions caused by thermal lamination and color development occurred in all the ground portions. Therefore, additional optical recording (7) could not be carried out.

As described on the foregoing pages, the reversible multi-color thermal recording medium and reversible multi-color optical recording medium of the present invention which use urea and thiourea derivatives as a reversible heat-resistant color developer and irreversible heat-resistant color developer cause almost no fogging of a ground color under temperature environment of up to 160° C. and recording of an image having a vivid color tone and many practical applications is easily effected with a thermal recording apparatus such as a thermal head and an optical recording apparatus using a laser or strobe. Therefore, the present invention has the following effects.

(1) A reversible multi-color thermal recording medium and a reversible multi-color optical recording medium providing a vivid color tone can be obtained.

(2) The reversible multi-color thermal recording medium and the reversible multi-color optical recording medium can be used under extreme temperature conditions (90° to 160° C., for example) under which conventional recording media cannot be used.

(3) Since the reversible multi-color thermal recording medium and reversible multi-color optical recording medium which have recorded images can undergo thermal lamination with a laminator, reversible multi-color thermal recording cards and reversible multi-color optical recording cards can be fabricated with ease.

(4) Additional optical recording can be made on a laminated reversible multi-color optical recording medium.

(5) Since the ground colors of the reversible multi-color thermal recording medium and reversible multi-color optical recording medium are stable even if they were fed through a heated roll, they can be used as paper for electronic photocopiers.

Further, in the present invention, since the hue of an image obtained by first recording or erasure is made different from that of an image recorded next by combining a reversible recording composition and an irreversible recording composition, it is possible to find whether or not a recorded image is recorded additionally, thus making it usable for prevention of forgeries.

What is claimed is:

1. A reversible multi-color thermal recording medium comprising
an irreversible thermal composition recording layer containing a colorless or pale basic achromatic dye and an organic irreversible heat-resistant color developer as main components and
a reversible multi-color thermal composition recording layer containing a colorless or pale basic achromatic dye and an organic reversible heat-resistant color developer as main components laminated on a support,
wherein the reversible heat-resistant color developer is represented by the following formula (I):

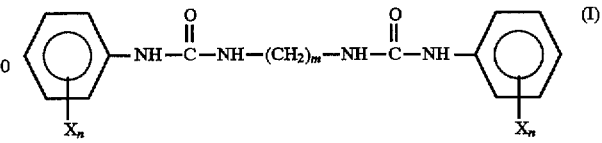

wherein X is selected from the group consisting of a hydrogen atom, alkyl group having 1 to 12 carbon atoms, halogenated alkyl group having 1 to 3 carbon atoms, alkoxy group having 1 to 12 carbon atoms, alkoxycarbonyl group having 1 to 12 carbon atoms, acyl group having 1 to 12 carbon atoms, dialkylamino group having 1 to 12 carbon atoms, nitro group, cyano group and halogen atom, m is an integer of 1 to 12, and n is an integer of 1 to 3, or the following formula (I'):

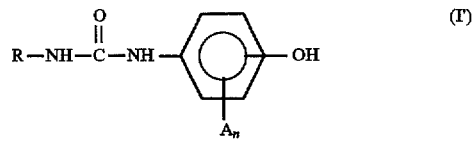

wherein R is an alkyl group having 12 to 22 carbon atoms, A is selected from the group consisting of a lower alkyl group, lower alkoxy group, lower alkoxycarbonyl group, nitro group, halogen atom and hydrogen atom, and n is an integer of 1 to 3, and the irreversible heat-resistant color developer is represented by the following formula (II):

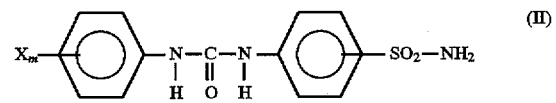

wherein X is selected from the group consisting of a lower alkyl group having 1 to 4 carbon atoms, alkoxy group having 1 to 3 carbon atoms, hydrogen atom, nitro group, cyano group and halogen atom, and m is an integer of 1 to 3.

2. A reversible multi-color thermal recording medium according to claim 1, wherein the irreversible thermal composition recording layer and the reversible thermal composition recording layer are laminated on said support with an intermediate layer interposed therebetween.

3. A reversible multi-color thermal recording medium according to claim 1, wherein the irreversible heat-resistant color developer is represented by the following general formula (III):

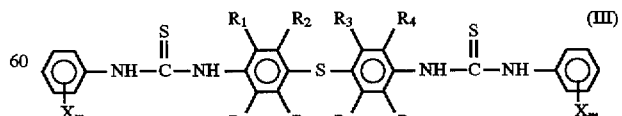

wherein X, R1, R2, R3, R4, R5, R6, R7 and R8 are independently selected from the group consisting of a lower alkyl group having 1 to 6 carbon atoms, alkoxy group having 1 to 6 carbon atoms, hydrogen atom, nitro group, cyano group and halogen atom, and m is an integer of 1 to 3.

4. A reversible multi-color thermal recording medium according to claim 1, wherein the irreversible heat-resistant color developer is represented by the following general formula (IV):

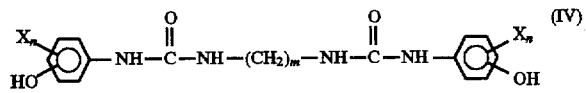

wherein X is selected from the group consisting of a lower alkyl group having 1 to 6 carbon atoms, alkoxy group having 1 to 6 carbon atoms, nitro group, halogen atom and hydrogen atom, m is an integer of 1 to 12, and n is an integer of 1 or 2.

5. A reversible multi-color thermal recording medium according to claim 1, wherein the irreversible heat-resistant color developer is represented by the following general formula (V):

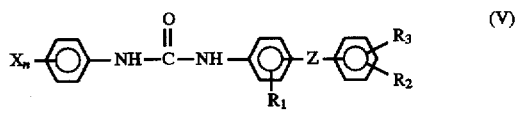

wherein X is selected from the group consisting of an alkyl group having 1 to 12 carbon atoms, alkoxy group having 1 to 12 carbon atoms, trihalogenated methyl group, hydrogen atom, nitro group and halogen atom, Z is selected from the group consisting of O, S, straight chain having 1 to 12 carbon atoms, branched alkylene group, NH, $SO_2$ and C=O, R1, R2 and R3 are independently selected from the group consisting of an alkyl group having 1 to 6 carbon atoms, hydrogen atom, nitro group and halogen atom, and n is an integer of 1 to 3.

6. A reversible multi-color thermal recording medium comprising an irreversible thermal composition recording layer containing a colorless or pale basic achromatic dye and an organic irreversible heat-resistant color developer as main components and a reversible multi-color thermal composition recording layer containing a colorless or pale basic achromatic dye and an organic reversible heat-resistant color developer as main components laminated on a support, wherein the reversible heat-resistant color developer is represented by the following formula (I):

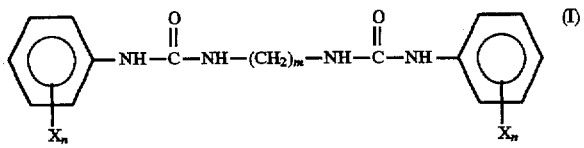

wherein X is selected from the group consisting of a hydrogen atom, alkyl group having 1 to 12 carbon atoms, halogenated alkyl group having 1 to 3 carbon atoms, alkoxy group having 1 to 12 carbon atoms, alkoxycarbonyl group having 1 to 12 carbon atoms, acyl group having 1 to 12 carbon atoms, dialkylamino group having 1 to 12 carbon atoms, nitro group, cyano group and halogen atom, m is an integer of 1 to 12, and n is an integer of 1 to 3, and the irreversible heat-resistant color developer is represented by the following formula (II):

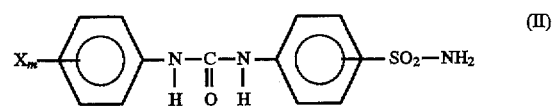

wherein X is selected from the group consisting of a lower alkyl group having 1 to 4 carbon atoms, alkoxy group having 1 to 3 carbon atoms, hydrogen atom, nitro group, cyano group and halogen atom, and m is an integer of 1 to 3.

7. A reversible multi-color thermal recording medium according to claim 6, wherein the irreversible thermal composition recording layer and the reversible thermal composition recording layer are laminated on said support with an intermediate layer interposed therebetween.

8. A reversible multi-color thermal recording medium according to claim 6 wherein in the formula II X is $C_1$ to $C_4$ alkyl and m is 1 or 2.

9. A reversible multi-color thermal recording medium according to claim 6 wherein in the formula II X is a member selected from the group consisting of Cl, Br, F, I, $NO_2$ and CN and m is 1 or 2.

10. A reversible multi-color thermal recording medium according to claim 6 wherein in the formula II X is $C_1$ to $C_2$ alkoxy group and m is 1 or 2.

11. A reversible multi-color thermal recording medium prepared by laminating a plastic film on the recorded surface of the reversible multi-color thermal recording medium of claim 6 or the entire recording medium after thermal recording.

12. A reversible multi-color optical recording medium which contains a light absorbent for absorbing light and converting it into heat in the recording layer of the reversible multi-color thermal recording medium of claim 6.

13. An optical recording medium prepared by laminating a plastic film on the recording surface of the reversible multi-color optical recording medium of claim 12 or the entire recording medium.

14. An optical recording medium prepared by laminating a plastic film on the recording surface of the reversible multi-color optical recording medium of claim 12 or the entire recording medium after thermal recording or optical recording.

15. An optical recording method wherein additional recording is made on the optical recording medium of claim 13 or 14 with flash light from a strobe or laser light.

16. A sheet for electronic photocopies comprising the reversible multi-color thermal recording medium of claim 6, or the reversible multi-color optical recording medium of claim 12.

17. A reversible multi-color thermal recording medium comprising an irreversible thermal composition recording layer containing a colorless or pale basic achromatic dye and an organic irreversible heat-resistant color developer as main components and a reversible multi-color thermal composition recording layer containing a colorless or pale basic achromatic dye and an organic reversible heat-resistant color developer as main components laminated on a support, wherein the reversible heat-resistant color developer is represented by the following formula (I'):

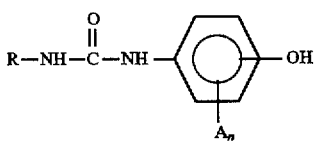

(I')

wherein R is an alkyl group having 12 to 22 carbon atoms, A is selected from the group consisting of a lower alkyl group, lower alkoxy group, lower alkoxycarbonyl group, nitro group, halogen atom and hydrogen atom, and n is an integer of 1 to 3, and the irreversible heat-resistant color developer is represented by the following formula (II):

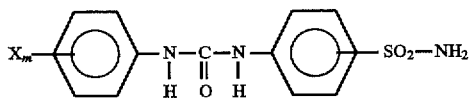

(II)

wherein X is selected from the group consisting of a lower alkyl group having 1 to 4 carbon atoms, alkoxy group having 1 to 3 carbon atoms, hydrogen atom, nitro group, cyano group and halogen atom, and m is an integer of 1 to 3.

18. A reversible multi-color thermal recording medium according to claim 17, wherein the irreversible thermal composition recording layer and the reversible thermal composition recording layer are laminated on said support with an intermediate layer interposed therebetween.

19. A reversible multi-color thermal recording medium according to claim 17 wherein in the formula II X is $C_1$ to $C_4$ alkyl and m is 1 or 2.

20. A reversible multi-color thermal recording medium according to claim 17 wherein in the formula II X is a member selected from the group consisting of Cl, Br, F, I, $NO_2$ and CN and m is 1 or 2.

21. A reversible multi-color thermal recording medium according to claim 17 wherein in the formula II X is $C_1$ to $C_2$ alkoxy group and m is 1 or 2.

22. A reversible multi-color thermal recording medium prepared by laminating a plastic film on the recorded surface of the reversible multi-color thermal recording medium of claim 17 or the entire recording medium after thermal recording.

23. A reversible multi-color optical recording medium which contains a light absorbent for absorbing light and converting it into heat in the recording layer of the reversible multi-color thermal recording medium of claim 17.

24. An optical recording medium prepared by laminating a plastic film on the recording surface of the reversible multi-color optical recording medium of claim 23 or the entire recording medium.

25. An optical recording medium prepared by laminating a plastic film on the recording surface of the reversible multi-color optical recording medium of claim 23 or the entire recording medium after thermal recording or optical recording.

26. An optical recording method wherein additional recording is made on the optical recording medium of claim 24 or 25 with flash light from a strobe or laser light.

27. A sheet for electronic photocopies comprising the reversible multi-color thermal recording medium of claim 17 or the reversible multi-color optical recording medium of claim 23.

* * * * *